US008566306B2

(12) United States Patent
Jones

(10) Patent No.: US 8,566,306 B2
(45) Date of Patent: *Oct. 22, 2013

(54) SCALABLE SEARCH SYSTEM USING HUMAN SEARCHERS

(75) Inventor: Scott A Jones, Carmel, IN (US)

(73) Assignee: Chacha Search, Inc., Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/241,363

(22) Filed: Sep. 23, 2011

(65) Prior Publication Data

US 2012/0016860 A1 Jan. 19, 2012

Related U.S. Application Data

(63) Continuation of application No. 11/336,928, filed on Jan. 23, 2006, now Pat. No. 8,065,286.

(51) Int. Cl.
*G06F 7/00* (2006.01)
(52) U.S. Cl.
USPC .......................................................... 707/718
(58) Field of Classification Search
USPC .......................................................... 707/718
See application file for complete search history.

(56) References Cited

U.S. PATENT DOCUMENTS

| 5,270,701 A | 12/1993 | Ito et al. |
| 5,301,314 A | 4/1994 | Gifford et al. |
| 5,559,940 A | 9/1996 | Hutson |
| 5,628,011 A | 5/1997 | Ahamed et al. |
| 5,724,571 A | 3/1998 | Woods |
| 5,732,259 A | 3/1998 | Konno |
| 5,768,580 A | 6/1998 | Wical |
| 5,845,278 A | 12/1998 | Kirsch |
| 5,855,015 A | 12/1998 | Shoham |
| 5,862,223 A | 1/1999 | Walker et al. |
| 5,875,231 A | 2/1999 | Farfan |
| 5,915,010 A | 6/1999 | McCalmont |
| 5,918,010 A | 6/1999 | Appleman et al. |

(Continued)

FOREIGN PATENT DOCUMENTS

| EP | 1209583 | 5/2002 |
| EP | 1341099 | 9/2003 |

(Continued)

OTHER PUBLICATIONS

International Search Report issued Jan. 25, 2008 in PCT/US07/75369.

(Continued)

*Primary Examiner* — Truong Vo
(74) *Attorney, Agent, or Firm* — Staas & Halsey

(57) ABSTRACT

A system allowing a query to be submitted to a server that locates a human searcher to perform a search. The searcher performs a search including using conventional tools, browser, and provides results to the user. A searcher who produces result(s) accepted by the user is rewarded and the results can be used when a similar query is submitted by another user. The searcher is bested by comparing keywords of the query to keywords for which the searcher has registered and a high ranking searcher may be chosen by the system based on various factor(s). While the search is performed, information including videos, games, advertisements, etc., may be provided to the user based on keywords of the query and selection by the searcher. The reward for the searchers can be based on revenue from advertisements.

20 Claims, 17 Drawing Sheets

(56) References Cited

U.S. PATENT DOCUMENTS

| | | |
|---|---|---|
| 5,948,054 A | 9/1999 | Nielson |
| 5,956,491 A | 9/1999 | Marks |
| 5,982,370 A | 11/1999 | Kamper |
| 6,006,218 A | 12/1999 | Breese et al. |
| 6,026,148 A | 2/2000 | Dworkin et al. |
| 6,081,788 A | 6/2000 | Appleman et al. |
| 6,094,652 A | 7/2000 | Faisal |
| 6,101,515 A | 8/2000 | Wical et al. |
| 6,115,709 A | 9/2000 | Gilmour et al. |
| 6,128,646 A | 10/2000 | Miloslavsky |
| 6,157,926 A | 12/2000 | Appleman et al. |
| 6,195,681 B1 | 2/2001 | Appleman et al. |
| 6,205,472 B1 | 3/2001 | Gilmour |
| 6,212,517 B1 | 4/2001 | Sato |
| 6,223,165 B1 | 4/2001 | Lauffer |
| 6,226,648 B1 | 5/2001 | Appleman et al. |
| 6,253,202 B1 | 6/2001 | Gilmour |
| 6,327,590 B1 | 12/2001 | Chidlovskii et al. |
| 6,336,132 B2 | 1/2002 | Appleman et al. |
| 6,346,952 B1 | 2/2002 | Shtivelman |
| 6,370,527 B1 | 4/2002 | Singhal |
| 6,377,944 B1 | 4/2002 | Busey et al. |
| 6,377,949 B1 | 4/2002 | Gilmour |
| 6,405,197 B2 | 6/2002 | Gilmour |
| 6,421,669 B1 | 7/2002 | Gilmour et al. |
| 6,434,549 B1 | 8/2002 | Linetsky et al. |
| 6,493,711 B1 | 12/2002 | Jeffrey |
| 6,505,166 B1 | 1/2003 | Stephanou |
| 6,507,821 B1 | 1/2003 | Stephanou |
| 6,507,841 B2 | 1/2003 | Rivierieulx de Varax |
| 6,513,013 B1 | 1/2003 | Stephanou |
| 6,523,010 B2 | 2/2003 | Lauffer |
| 6,526,404 B1 | 2/2003 | Slater et al. |
| 6,549,889 B2 | 4/2003 | Lauffer |
| 6,578,010 B1 | 6/2003 | Teacherson |
| 6,578,022 B1 | 6/2003 | Foulger et al. |
| 6,584,471 B1 | 6/2003 | Maclin |
| 6,636,590 B1 | 10/2003 | Jacob et al. |
| 6,640,229 B1 | 10/2003 | Gilmour et al. |
| 6,647,383 B1 | 11/2003 | August et al. |
| 6,647,384 B2 | 11/2003 | Gilmour |
| 6,675,159 B1 | 1/2004 | Lin et al. |
| 6,691,108 B2 * | 2/2004 | Li ................................. 707/710 |
| 6,708,165 B2 | 3/2004 | Jeffrey |
| 6,732,088 B1 | 5/2004 | Glance |
| 6,732,156 B2 | 5/2004 | Miloslavsky |
| 6,742,178 B1 | 5/2004 | Berry et al. |
| 6,745,178 B1 | 6/2004 | Emens et al. |
| 6,801,899 B2 | 10/2004 | Lauffer |
| 6,829,585 B1 | 12/2004 | Grewal |
| 6,895,406 B2 | 5/2005 | Fables |
| 6,901,394 B2 | 5/2005 | Chauhan et al. |
| 6,938,048 B1 | 8/2005 | Jilk et al. |
| 6,970,879 B1 | 11/2005 | Gilmour |
| 6,983,311 B1 | 1/2006 | Haitsuka et al. |
| 7,039,625 B2 | 5/2006 | Kim et al. |
| 7,043,450 B2 | 5/2006 | Velez |
| 7,085,771 B2 | 8/2006 | Chung et al. |
| 7,120,647 B2 | 10/2006 | Venkatesh et al. |
| 7,149,707 B2 | 12/2006 | Scoble |
| 7,155,400 B1 | 12/2006 | Jilk et al. |
| 7,167,855 B1 | 1/2007 | Koenig |
| 7,203,725 B1 | 4/2007 | Gilmour |
| 7,224,781 B2 | 5/2007 | Jacob et al. |
| 7,249,045 B2 | 7/2007 | Lauffer |
| 7,287,021 B2 | 10/2007 | De Smet |
| 7,289,612 B2 | 10/2007 | Lurie et al. |
| 7,370,034 B2 | 5/2008 | Franciosa et al. |
| 7,440,947 B2 * | 10/2008 | Adcock et al. ........................ 1/1 |
| 2001/0034646 A1 | 10/2001 | Hoyt et al. |
| 2002/0059395 A1 | 5/2002 | Liou |
| 2002/0087520 A1 | 7/2002 | Meyers |
| 2002/0095320 A1 | 7/2002 | Pavone et al. |
| 2002/0099700 A1 | 7/2002 | Li |
| 2002/0107709 A1 | 8/2002 | Colson et al. |
| 2002/0111934 A1 | 8/2002 | Narayan |
| 2002/0140715 A1 | 10/2002 | De Smet |
| 2002/0167539 A1 | 11/2002 | Brown et al. |
| 2003/0002445 A1 | 1/2003 | Fullana |
| 2003/0004838 A1 | 1/2003 | Kusuda et al. |
| 2003/0018626 A1 | 1/2003 | Kay et al. |
| 2003/0046098 A1 | 3/2003 | Kim |
| 2003/0074303 A1 | 4/2003 | Gould |
| 2003/0084040 A1 | 5/2003 | Jeffrey |
| 2003/0088465 A1 | 5/2003 | Monteverde |
| 2003/0088467 A1 | 5/2003 | Culver |
| 2003/0093317 A1 | 5/2003 | Robinson et al. |
| 2003/0101083 A1 | 5/2003 | Venkatesh et al. |
| 2003/0120542 A1 | 6/2003 | Arning |
| 2003/0140037 A1 | 7/2003 | Deh-Lee |
| 2003/0144994 A1 | 7/2003 | Wen |
| 2003/0145001 A1 | 7/2003 | Craig |
| 2003/0163368 A1 | 8/2003 | Bastone |
| 2003/0163454 A1 | 8/2003 | Jacobsen |
| 2003/0174818 A1 | 9/2003 | Hazenfield |
| 2003/0198325 A1 | 10/2003 | Bayne |
| 2003/0217335 A1 | 11/2003 | Chung et al. |
| 2003/0227479 A1 | 12/2003 | Mizrahi |
| 2003/0228558 A1 | 12/2003 | Bloom et al. |
| 2004/0010484 A1 | 1/2004 | Foulger et al. |
| 2004/0023644 A1 | 2/2004 | Montemer |
| 2004/0024752 A1 | 2/2004 | Manber |
| 2004/0049541 A1 | 3/2004 | Swahn |
| 2004/0133469 A1 | 7/2004 | Chang |
| 2004/0162830 A1 | 8/2004 | Shirwadkar et al. |
| 2004/0177088 A1 | 9/2004 | Jeffrey |
| 2004/0186738 A1 | 9/2004 | Reisman |
| 2004/0203634 A1 | 10/2004 | Wang et al. |
| 2004/0243466 A1 | 12/2004 | Trzybinski et al. |
| 2005/0021599 A1 | 1/2005 | Peters |
| 2005/0071741 A1 | 3/2005 | Acharya et al. |
| 2005/0086290 A1 | 4/2005 | Joyce et al. |
| 2005/0091123 A1 | 4/2005 | Freishtat et al. |
| 2005/0097000 A1 | 5/2005 | Freishtat et al. |
| 2005/0097159 A1 | 5/2005 | Skidgel |
| 2005/0097188 A1 | 5/2005 | Fish |
| 2005/0105712 A1 | 5/2005 | Williams |
| 2005/0114208 A1 | 5/2005 | Arbuckle et al. |
| 2005/0119957 A1 | 6/2005 | Faber et al. |
| 2005/0131866 A1 | 6/2005 | Badros |
| 2005/0136949 A1 | 6/2005 | Barnes |
| 2005/0138115 A1 | 6/2005 | Llamas et al. |
| 2005/0154723 A1 | 7/2005 | Liang |
| 2005/0210042 A1 | 9/2005 | Goedken |
| 2005/0251440 A1 | 11/2005 | Bednarek |
| 2005/0278633 A1 | 12/2005 | Kemp |
| 2005/0289124 A1 | 12/2005 | Kaiser |
| 2006/0004891 A1 | 1/2006 | Hurst-Hiller et al. |
| 2006/0010105 A1 | 1/2006 | Sarukkai |
| 2006/0041476 A1 | 2/2006 | Zheng |
| 2006/0041550 A1 * | 2/2006 | Bennett et al. ..................... 707/5 |
| 2006/0064411 A1 * | 3/2006 | Gross et al. ........................ 707/3 |
| 2006/0074864 A1 | 4/2006 | Naam et al. |
| 2006/0129536 A1 | 6/2006 | Foulger et al. |
| 2006/0143160 A1 | 6/2006 | Vayssiere |
| 2006/0149644 A1 | 7/2006 | Sulmar et al. |
| 2006/0190327 A1 | 8/2006 | Jmaev |
| 2006/0200556 A1 | 9/2006 | Brave et al. |
| 2006/0215826 A1 | 9/2006 | Lurie et al. |
| 2006/0235690 A1 | 10/2006 | Tomasic et al. |
| 2006/0235793 A1 | 10/2006 | Walker et al. |
| 2006/0247981 A1 | 11/2006 | Singh et al. |
| 2006/0282336 A1 | 12/2006 | Huang |
| 2006/0286530 A1 | 12/2006 | Forrest et al. |
| 2006/0287916 A1 | 12/2006 | Starr et al. |
| 2006/0288087 A1 | 12/2006 | Sun |
| 2006/0294085 A1 | 12/2006 | Rose et al. |
| 2007/0005344 A1 | 1/2007 | Sandor |
| 2007/0005698 A1 | 1/2007 | Kumar et al. |
| 2007/0014537 A1 | 1/2007 | Wesemann et al. |
| 2007/0027859 A1 | 2/2007 | Harney et al. |
| 2007/0038601 A1 | 2/2007 | Guha |
| 2007/0050388 A1 | 3/2007 | Martin |
| 2007/0078803 A1 | 4/2007 | Gilmour et al. |

(56) References Cited

U.S. PATENT DOCUMENTS

| | | |
|---|---|---|
| 2007/0112761 A1 | 5/2007 | Xu et al. |
| 2007/0143262 A1 | 6/2007 | Kasperski |
| 2007/0150464 A1 | 6/2007 | Brave et al. |
| 2007/0150465 A1 | 6/2007 | Brave et al. |
| 2007/0150466 A1 | 6/2007 | Brave et al. |
| 2007/0150470 A1 | 6/2007 | Brave et al. |
| 2007/0150515 A1 | 6/2007 | Brave et al. |
| 2007/0192166 A1 | 8/2007 | Van Luchene |
| 2007/0192300 A1 | 8/2007 | Reuther et al. |
| 2007/0198340 A1 | 8/2007 | Lucovsky et al. |
| 2007/0208570 A1 | 9/2007 | Bhardwaj et al. |
| 2007/0219978 A1 | 9/2007 | Myers |
| 2007/0260587 A1 | 11/2007 | Mohan |
| 2007/0260601 A1 | 11/2007 | Thompson |
| 2007/0288436 A1 | 12/2007 | Cao |
| 2008/0010113 A1 | 1/2008 | Lanter, Jr. et al. |
| 2008/0049917 A1 | 2/2008 | Lurie et al. |
| 2008/0126221 A1 | 5/2008 | Swanson |
| 2011/0106617 A1* | 5/2011 | Cooper et al. ............. 705/14.49 |

FOREIGN PATENT DOCUMENTS

| | | |
|---|---|---|
| WO | WO 02/097705 | 12/2002 |
| WO | WO 2005/091189 | 9/2005 |
| WO | WO 2007/052285 | 5/2007 |

OTHER PUBLICATIONS

International Search Report issued Feb. 12, 2008 in PCT/US07/60467.
International Search Report issued Jun. 2, 2008 in PCT/US07/60459.
International Search Report issued Feb. 15, 2008 in PCT/US07/60468.
International Search Report issued Feb. 7, 2008 in PCT/US07/60472.
International Search Report issued Aug. 6, 2009 in PCT/US2007/089223.
"Library Question—Answer—Question #1205187", Santa Monica Public Library's Question Point, Dec. 2005.
Mossberg, Walter S., et al., "What You Should Know About Web Searches—A Guide to Search-Engine Features", Wall Street Journal, Dec. 2005, p. D1.
"Connotate—Beyond Search", Connotate Technologies, http://www.connotate.com/beyond_search/beyond_search.asp, printed Feb. 21, 2006.
Wired Magazine, "Serf Engine", http://www.wired.com/wired/archive/8.07/mustread.html?pg=13, printed Jan. 26, 2006.
"SmartDraw Viewer", http://www.smartdraw.com/product/viewer.htm, printed Mar. 21, 2006.
"Google Answers", http://www.google.com, printed Dec. 13, 2005.
"Leave the Surfing to the Pros, Please", The Travel Technologist, Mar. 2, 2000, http://www.elliott.org/technology/2000/inetnow.htm, printed Jan. 26, 2006.
Kharif, Olga, "Microsoft Gets Social", Business Week Online, Apr. 12, 2006, www.businessweek.com.
"iNetNow.com", Breakthrough Technologies, http://www.breakthrough-tech.com/projects/inetnow/, printed Jan. 26, 2006.
Tedeschi, Bob, "Google's Shadow Payroll is not Such a Secret Anymore", The New York Times, E-Commerce Report, Jan. 16, 2006.
"Gravee Search", http://www.gravee.com, printed Mar. 21, 2006.
"Just Answer", http://www.justanswer.com/forum_topics.asp, printed Mar. 21, 2006.
"Ask Now", http://www.asknow.org/chat/chat.cfm, printed Dec. 13, 2005.
"All Experts", http://www.allexperts.com/central/service2.shtml, printed Mar. 21, 2006.
"Keyword Research Guide", WordTracker Keywords, http://www.wordtracker.com.
"Google Answers", retrieved from Internet at URL: http://answers.google.com/answers/?gsessionidJ_TcHewne3Y on Sep. 25, 2007.
Lambert, Nancy, "BountyQuest Revisited: The Coin Has Two Sides", Apr. 2, 2001, Retrieved from Internet at URL: http://newsbreaks.infotoday.com/nbReader.asp?ArticleID=17623 on Sep. 25, 2007.
"AllExperts Questions & Answers", retrieved from Internet at URL: http://www.allexperts.com/ on Sep. 25, 2007.
"AskAnything Technologies", retrieved from Internet at URL: http://www.askanything.com/ on Sep. 25, 2007.
"BumperBrain", retrieved from Internet at URL: http://www.bumperbrain.com/ on Sep. 25, 2007.
"Kasamba", retrieved from Internet at URL: http://www.kasamba.com on Sep. 25, 2007.
"WebSearchexperts.com to be the First to Dominate the New Internet Search Engine Paradigm", Business Wire, Oct. 21, 1999.
iNetNow Announces the First Human-Powered Internet Search Engine; New Company Allows Access to Experienced, Web Surfers Via Phone 24 Hours a Day, 7 Days a Week, Business Wire, Mar. 6, 2000.
"Human Search Engines—the next killer app?", Gale Group, 2000.
Carmel, et al., "Searching XML Documents via XML Fragments," 2003, ACM, pp. 151-158.
Karat, et al., "Patterns of Entry and Correction in Large Vocabulary Continuous Speech Recognition Systems," 1999, ACM, pp. 568-575.
"Googling from your Mobile Phone—no Web Browser Needed!," Google Tutor, 2005.
Varshney, et al., "Voice Over IP," Communications of the ACM, 2002, vol. 45, No. 1, pp. 89-96.
Knoblock, Craig A., "Searching the World Wide Web," IEEE Expert, 1997, pp. 8-14.
Sullivan, Danny, "Google launches Personalized Home Page," Search Engine Watch, May 2005.
"CHI Image Sorting," Google Blogoscoped, Mar. 28, 2005, http://blog-outer-court.com/archive/2005-03-28-n53.html.
"Amazon's Mechanical Turk", Google Blogoscoped, Nov. 4, 2005, http://blog.outer-court.com/archive/2005-11-04-n69.html.
Benkler, Yochai, "Coase's Penguin, or, Linux and the Nature of the Firm", The Yale Law Journal, vol. 112, 2002.
"CHI, a Collaborative Human Interpreter", Google Blogoscoped, Mar. 25, 2005, http://blog.outer-court.com/archive/2005-03-25-n43.html.
Koffey, N., "Webhelp.com answers with a personal touch", Nov. 30, 1999, pp. 1-2.
Kenney, et al., "Google Meets eBay", D-Lib Magazine, Jun. 2003, vol. 9 No. 6.
Yuwono, et al., "A World Wide Web Resource Discovery System", The Hong Kong University of Science and Technology Library, 1995.
Howe, et al., "SAVVYSEARCH: A Metasearch Engine that Learns Which Search Engines to Query", American Association for Artificial Intelligence, 1997.
Jamtgaard, et al., "Bringing the Wireless Internet to Mobile Devices", IEEE, 2001.
Pizzato, et al., "Extracting Exact Answers using a Meta Question Answering System," Proceedings of the Australasian Language Technology Workshop 2005, pp. 105-112, Dec. 2005.
Dreilinger, Daniel, et al., "Experience with Selecting Search Engine Using Metasearch," ACM Transactions on Information Systems, vol. 15, No. 3, Jul. 1997.
Non-final Office Action dated Nov. 24, 2010 issued in U.S. Appl. No. 11/835,080.
Final Office Action dated May 9, 2011 issued in U.S. Appl. No. 11/835,080.
International Preliminary Report, mailed Aug. 7, 2008, PCT/US2007/060472.
International Preliminary Report, mailed Aug. 7, 2008, PCT/US2007/060459.
International Preliminary Report, mailed Aug. 7, 2008, PCT/US2007/060467.
International Preliminary Report, mailed Aug. 6, 2009, PCT/US2007/060223.
International Preliminary Report, mailed Aug. 7, 2008, PCT/US2007/060468.
International Preliminary Report, mailed Feb. 19, 2009, PCT/US2007/075369.

(56) References Cited

OTHER PUBLICATIONS

Non-Final Office Action dated May 13, 2008 issued in U.S. Appl. No. 11/336,928.
Final Office Action dated Sep. 2, 2009 issued in U.S. Appl. No. 11/336,928.
Non-Final Office Action dated Sep. 29, 2010 issued in U.S. Appl. No. 11/336,928.
Final Office Action dated Mar. 16, 2011 issued in U.S. Appl. No. 11/336,928.
Notice of Allowance dated Aug. 26, 2011 issued in U.S. Appl. No. 11/336,928.
Australia Patent Office Examiner's first report mailed Mar. 29, 2011 in PCT/US2007060472 for copending Australia Patent Application No. 2007206022.
State Intellectual Property Office of China, First Office Action mailed on May 12, 2010 in PCT/US2007060472 for copending Chinese Patent Application No. 200780010282.1.
European Patent Office Communication issued May 12, 2009 for PCT/US2007060472 for copending EU Patent Application No. 07717987.7.
European Patent Office Communication issued Aug. 13, 2010 for PCT/US2007060472 for copending EU Patent Application No. 07717987.7.
New Zealand Office Action issued Jan. 19, 2010 for PCT/US2007060472 for copending New Zealand Patent Application No. 570671.
New Zealand Office Action issued Apr. 26, 201' for PCT/US2007060472 for copending New Zealand Patent Application No. 570671.
Non-final Office Action dated Aug. 8, 2011 issued in U.S. Appl. No. 12/098,782.
Non-final Office Action dated Mar. 31, 2009 issued in U.S. Appl. No. 11/647,286.
Final Office Action dated Nov. 12, 2009 issued in U.S. Appl. No. 11/647,286.
Non-final Office Action dated Sep. 29, 2010 issued in U.S. Appl. No. 11/647,286.
Notice of Allowance dated Jan. 27, 2011 issued in U.S. Appl. No. 11/647,286.
Australia Patent Office Examiner's first report mailed Mar. 29, 2011 in PCT/US2007060459 for copending Australia Patent Application No. 2007208181.
State Intellectual Property Office of China, First Office Action mailed on Oct. 21, 2010 in PCT/US2007060459 for copending Chinese Patent Application No. 200780010330.7.
European Patent Office Communication issued May 12, 2009 for PCT/US2007060459 for copending EU Patent Application No. 07762508.5.
European Patent Office Communication issued Aug. 13, 2010 for PCT/US2007060459 for copending EU Patent Application No. 07762508.5.
Mexican Industrial Property Institute Office Action issued Jun. 27, 2011 for PCT/US2007060459 for copending Mexican Patent Application No. MX/a/2008/009453.
New Zealand Office Action issued Jan. 19, 2010 for PCT/US2007060459 for copending New Zealand Patent Application No. 570640.
New Zealand Office Action issued May 12, 2011 for PCT/US2007060459 for copending New Zealand Patent Application No. 570640.
Non-final Office Action dated Mar. 31, 2009 issued in U.S. Appl. No. 11/469,732.
Final Office Action dated Aug. 20, 2009 issued in U.S. Appl. No. 11/469,732.
Non-final Office Action dated Feb. 1, 2010 issued in U.S. Appl. No. 11/469,732.
Final Office Action dated Jun. 7, 2010 issued in U.S. Appl. No. 11/469,732.
Non-final Office Action dated Feb. 2, 2011 issued in U.S. Appl. No. 11/469,732.
Notice of Allowance dated Jun. 22, 2011 issued in U.S. Appl. No. 11/469,732.
Notice of Allowance dated Oct. 3, 2011 issued in U.S. Appl. No. 11/469,732.
State Intellectual Property Office of China, First Office Action mailed on May 12, 2010 in PCT/US2007060467 for copending Chinese Patent Application No. 200780010292.5.
State Intellectual Property Office of China, Second Office Action mailed on Dec. 27, 2010 in PCT/US2007060467 for copending Chinese Patent Application No. 200780010292.5.
State Intellectual Property Office of China, Third Office Action mailed on Jul. 6, 2011 in PCT/US2007060467 for copending Chinese Patent Application No. 200780010292.5.
European Patent Office Communication issued May 12, 2009 for PCT/US2007060467 for copending EU Patent Application No. 07762604.2.
European Patent Office Communication issued Aug. 13, 2010 for PCT/US2007060467 for copending EU Patent Application No. 07762604.2.
New Zealand Office Action issued Jan. 19, 2010 for PCT/US2007060467 for copending New Zealand Patent Application No. 570643.
New Zealand Office Action issued May 5, 2011 for PCT/US2007060467 for copending New Zealand Patent Application No. 570643.
Non-final Office Action dated Nov. 7, 2008 issued in U.S. Appl. No. 11/626,173.
Final Office Action dated Jun. 22, 2009 issued in U.S. Appl. No. 11/626,173.
Non-final Office Action dated Dec. 1, 2009 issued in U.S. Appl. No. 11/626,173.
Final Office Action dated Jun. 22, 2010 issued in U.S. Appl. No. 11/626,173.
Non-final Office Action dated Feb. 14, 2011 issued in U.S. Appl. No. 11/626,173.
Final Office Action dated Aug. 24, 2011 issued in U.S. Appl. No. 11/626,173.
Non-final Office Action dated May 26, 2009 issued in U.S. Appl. No. 11/647,437.
Final Office Action dated Oct. 28, 2009 issued in U.S. Appl. No. 11/647,437.
Australia Patent Office Examiner's first report mailed Mar. 23, 2011 in PCT/US2007060468 for copending Australia Patent Application No. 2007211160.
State Intellectual Property Office of China, First Office Action mailed on May 13, 2010 in PCT/US2007060468 for copending Chinese Patent Application No. 200780010299.7.
European Patent Office Communication issued Jun. 7, 2009 for PCT/US2007060468 for copending EU Patent Application No. 07762823.8.
New Zealand Office Action issued Dec. 17, 2009 for PCT/US2007060468 for copending New Zealand Patent Application No. 570644.
New Zealand Office Action issued May 5, 2011 for PCT/US2007060468 for copending New Zealand Patent Application No. 570644.
Second Chinese Office Action issued Jul. 25, 2011 in PCT/US2007/060472 (Chinese App #200780010282.1).
Second Chinese Office Action issued Jul. 26, 2011 in PCT/US2007/060468 (Chinese App #200780010299.7).
Extended European Search Report issued Oct. 6, 2011 in PCT/US2007060472 (EU App 11176867.7).

\* cited by examiner

KEYPHRASES AVAILABLE FOR SIGN-UP

| KEYPHRASE/WEIGHT | # SEARCHERS LOGGED IN | # SEARCHERS SIGNED UP | QUERIES ON THIS KEYWORD PER HOUR | RATIO OF QUERIES/HOUR TO LOGGED IN SEARCHERS |
|---|---|---|---|---|
| BASEBALL/42 | 5 | 49 | 75 | 15 |
| SERIES/70 | 8 | 61 | 11 | 1 |
| WORLD/5 | 12 | 92 | 112 | 9 |
| WORLD SERIES/100 | 3 | 17 | 3 | 1 |
| MIN. PER KEYWORD | 0 | 0 | 0 | 0 |
| AVG. PER KEYWORD | 8 | 17 | 80 | 10 |
| MAX. PER KEYWORD | 33 | 50 | 398 | 46 |

FIG. 10E

SCALABLE SEARCH SYSTEM USING HUMAN SEARCHERS

BACKGROUND OF THE INVENTION

1. Field of the Invention

The present invention is directed to a system that utilizes human searchers to perform searches for users in real-time to provide highly relevant results from a broad base of knowledge which includes the "Deep Web", herein defined as that part of the web's vast amount of information that is still not commonly indexed by current search engines. Using this unique invention, users have access to a vast body of information or knowledge, from anywhere at anytime, offered in a way that makes it easy to find desired information quickly. The system may be accessed via text- or speech-based devices such as desktop computers, laptops, cell phones, telephones, and personal digital assistants. The user and searcher may communicate directly during the search process in order to provide much better results to the query. Searchers are motivated to participate because they may be compensated for providing timely and relevant results.

2. Description of the Related Art

In the current search environment a user can access a search engine, such as Google™ and perform a search. However, many users struggle with formulating a set of keywords that will result in the search engine obtaining useful results. (The term "keyword" includes one or more keywords and keyphrases that can include multiple keywords as well as natural language sentences that can be analyzed to extract keywords and keyphrases). Also, while there are already more web pages indexed than the world's population. It is estimated that less than 1% of all information is indexed by any given search engine.

Current search engines are very difficult to use on devices such as cellular telephones (cellphones) because the top search results are often not relevant to what the user really desires to know, forcing the user to look through a long set of listing results or to repeat queries in order to get more relevant results. Cellphone users are sometimes frustrated by the limited display capability and awkward input methods of cellphones, which further complicates the search function when using a cellphone.

Attempts have been made to have humans answer users' questions via a variety of mechanisms including via email, via information posted at websites, and via library reference desks that are connected to users via "chat" sessions. However, there are many limitations imposed by these and other offerings including having limited pools of "experts", having latency in delivering results, having helpers who are not sufficiently knowledgeable to provide optimal results, etc.

There are many advertising-based models on the web that have been tried with "search" applications, including ones that "target" the user by mapping advertisements to keywords based on keywords in a user's query.

What is needed is a widely accessible system that allows information seekers to find highly relevant information from a broad base of knowledge, offered in a way that one can find what one wants easily and quickly, from anywhere at anytime. Also needed is a business process that enables such a system to be sustainable.

SUMMARY OF THE INVENTION

It is an aspect of the present invention to provide a system that improves the experience of the user during a search, including providing highly relevant answers, by using human involvement in determining relevancy so that humans may sort and select results from traditional search engines and/or access information outside the domain of current search engines.

It is an aspect of this invention to overcome some of the current limitations of machine intelligence by providing an infrastructure that enable human searchers to provide better results to users who need answers to their questions or search queries.

It is an aspect of the invention that the human searchers may provide information to users that is available from traditional search engines and provide information that is beyond what is currently available via traditional search engines. Items from the "Deep Web" that may not be indexed by traditional search engines, may be "found" by searchers and reported to end users. These items might come from searcher's hard drives, intranets, a personal bookshelf, of from sites such as stores (e.g. Amazon) or auction sites (e.g. eBay).

It is also an aspect of the invention to provide a system that determines, in real-time, searchers capable of finding highly relevant answers to a user's query by having human searchers "sign up" in advance for particular keywords, or categories thereby enabling searchers to be prepared to answer queries relating to said keyword, or category.

It is an aspect of the invention to link users with searchers in real-time in an interactive and collaborative way so that the user can access high-quality and rapid help, getting the answer that he or she needs, where this may be accomplished via a chat session or by linking a user with a searcher via a speech- or text-enabled connection so that clarification may be sought and/or provided regarding the query, etc.

It is also an aspect of the invention that a searcher has a very rich toolset for performing rapid searching in a particular keyword area.

It is an aspect of the invention to have advertisements presented to users to generate revenues that enable the service to be self-sustaining without necessarily charging users for access to the service.

It is also an aspect of the invention that searchers can be compensated for their work so that there is a high degree of motivation to have a large pool of searchers available at all times on a wide range of topics.

It is also an aspect of the invention that compensation may be gifted to charities.

It is also an aspect of the invention that a speech capability is included so that the system can be accessed not only from computers but also through mobile phones and landline telephones and where speech may be transcribed into text in order for appropriate searchers to be connected to users.

It is also an aspect of the invention that large and small bonuses may be given to searchers who perform well with providing relevant answers in a timely manner.

It is also an aspect that some searchers will hand-select in real-time, advertisements that will be displayed for the end user. These advertisements may relate to keywords of the search phrase. Advertisers may bid to determine their exposure level to the human searchers and/or to the end user.

It is an aspect of the invention that advertisements may be provided to users and/or searchers in a highly targeted way.

It is an aspect of the invention that searchers submit their billing and personal information to the system so that the system can keep track of their availability, their profile, a method of compensating them, their keywords for which they are signed up to search, etc.

It is a broad and general aspect of the invention that real-time human-assisted search services on the Internet may be compensated for by displaying advertisements to end users while the search is being completed.

It is also an aspect of the invention to have methods of disabling, suspending, and/or neutralizing users and/or searchers who are attempting to stop, harm, or disrupt the system.

It is an aspect of the invention that searchers are assigned to users in such a way that searchers who have a proven track record are prioritized to perform searches for end users. A self-selecting "Darwinian" model motivates searchers to perform well. Users have an opportunity to influence the rating of the searcher.

It is an aspect of the invention that this system provides a default way to get results for users when human searchers are not available or when human searchers are not performing sufficiently fast or producing sufficiently relevant results where these "last resort" answers may be provided by relaying the query to traditional search engines and returning results to users, similar to the operation of meta-search engines in which users may be able to pick the default search engine to use as the "default" solution.

The above aspects can be attained by a system that allows a query to be submitted by a user and locates a human searcher who can perform a search on the query in real-time. The searcher performs a search using conventional and expanded search tools and provides the results to the user through the system. A searcher who produces a search accepted by the user is rewarded (e.g. with points and/or money or other consideration). The query and results can be stored for later use when another user submits a similar query. The searcher is located by comparing keywords of the query to keywords for which the searcher has indicated he/she will do searches. The searcher chosen by the system is one that ranks well in the keywords of the query that match to keywords registered by the searcher, prior successful searching by the searcher (for this specific keyword and/or in general), speed of producing search results for users during past searches, and other factors that help to provide a quality search and experience for the user. While the search is being performed, the user is mentally engaged by information provided to the user, such as advertisements, chat session with the searcher, videos, games, etc. The information presented to the user while the searcher is conducting a search on the user's behalf can be based on keywords of the query and designated by the searcher who performs the search. For example, there may be advertisements that are related to keywords that are displayed for the user. The searcher might even pick the advertisement that shows up on the user's computer, telephone, or other device. A variety of revenue schemes may be employed to optimize returns from the additional capability of having a human helping to decide what advertisement is most appropriate based on the form of the query.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 10A-10E show a searcher GUI during a search session

DETAILED DESCRIPTION OF THE PREFERRED EMBODIMENTS

Figure 1:
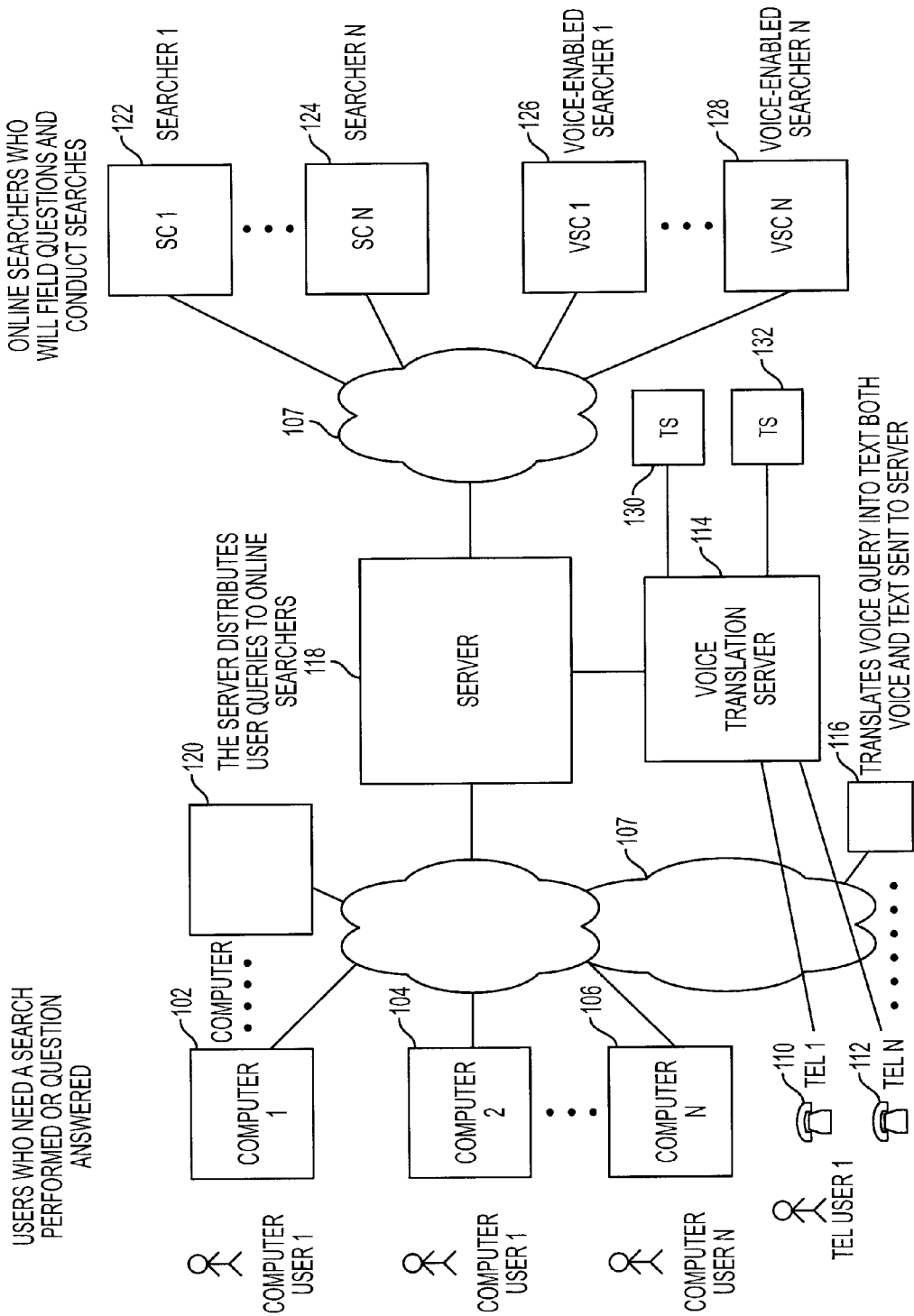
FIG. 1 depicts a system architecture embodiment.

The embodiments of the present invention include a system 100 that allows queries by users or information seekers (InfoSeekers™) such as a worker, a housewife or a child, to be searched by human searchers, who may be professional paid searchers (PaidSearchers™) as well as amateur and/or volunteer searchers. For example, the query (which, throughout this description, may entail a fully-formed question/sentence or a keyword or a list of keywords or a search phrase as previously discussed) might request, for example, the closing time of a particular restaurant, the winner of the 1960 World Series, or information regarding a medical illness (or any other type of query). As depicted in FIG. 1, the queries can originate from user computer systems 102-106 and are received over a communication system 107 or from telephone handsets 110-112. The user computer systems can be a typical desktop or laptop system, a handheld computer such as a personal digital assistant (PDA), a basic cellular telephone, a text-enabled cellular telephone, a specialized query terminal, or any other source that allows a user to enter a query via text or speech entry. (Note: the words "speech" and "voice" are used interchangeably in this discussion). The telephone handsets can be typical touch-tone telephones, cellular telephones, two-way radios or any other communication device that allows the user to talk over a distance. The communication system can include packet switched facilities, such as the Internet, circuit switched facilities, such as the public switched telephone network, radio based facilities, such as a wireless network, etc.

The oral speech queries by telephone 110-112 are stored in the system database and converted into digital text queries by a speech translation system 114. (Alternatively, the user's computer 102-106 or telephone 110-112 may perform this processing). The speech translation system 114 handles the task of translating the speech into text, possibly by interaction with other systems, or it may perform the task locally. It may perform speech to text conversion by using either speech transcription using human transcribers or using conventional speech-to-text processing, also known as automatic speech recognition (ASR). The speech queries can originate from a user's telephone and can be handled initially via automated attendant speech prompt type processing (or alternatively, via an interactive speech response or IVR system) to obtain the user's query.

The speech translation server 114 keeps track of the port from which the call originated and assigns a user identifier to the user 110-112 on this port for a particular session. The system 114 can prompt the user to speak the query. The speech queries can also originate from another source 116 called a "speech query service requester" (SQSR) rather than directly from the user, such as a private or public information provider. For example, a speech query can be initially processed by a public library telephone system and switched to the server 114. The speech query may physically arrive at the system via a variety of input means, including time-division multiplexed lines, voice over IP (VOIP) packets from an Internet connection, and other sources. The speech query may arrive as a stream or packet or series of packets.

Similarly, a commercial site, such as a grocery store ordering system where a user orders food and inquires about recipes for a special after-dinner dessert can initially process a speech query and pass it along to the speech translation server 114.

The SQSR 116 may communicate with the speech translation server 114 via a variety of mechanisms including an IP-based socket address or via a Microsoft .NET service, making the translation services of 114 widely available via the Internet to any application that wishes to use them.

The packet can then be processed locally at the speech translation server 114 to convert it from digitized speech into text or, alternatively, it may be processed by a remote system. If the digitized speech is being transcribed by human transcribers, this can be accomplished by sending the digitized speech to one or more transcriber systems (TS) 130-132 where human transcribers can hear the speech, for example via headphones or speakers, and transcribe the information by typing the text into their system, so that the text is then sent back to the speech translation server 114 (or alternatively, directly to the query server 118 or to the SQSR 116), all within a matter of seconds (preferably less than 10 seconds after the user has finished speaking the query). To speed up processing, the speech query can be and typically is preferably broken up into a stream of packets and passed to the transcriber, without interruption, as it is being spoken by the user, thereby allowing for reduced latency in the system. Preferably, there are many more transcribers available in the system than there are instantaneous queries so that delays are not induced into the system. In the case of an overflow of queries, a form of flow control may be utilized by telling some callers that they must hold on the line for an available transcriber (which might be described to the caller as holding for an operator or agent). Preferably, the speech translation server 114 maintains a database of all transcribers that are currently logged-in and available to perform the service of transcription using a transcription software application on their transcription system 130-132. Alternatively, this function of tracking the availability of transcribers might be located on a remote system and/or might be implemented using a distributed mechanism among transcriber systems 130-132 (for example, using P2P mechanisms).

The speech translation server 114 may feed continuous sequential speech phrases from various and different sources (e.g. users) to any given transcriber 130. Hence, the transcriber is sequentially transcribing, in rapid succession, speech messages from various speakers and creating separate text packets that are associated with each speech message.

Once the query is in digital text form, it is provided to the query server 118. The text entry features of cellular telephones can also be used to enter a query in digital text form allowing users to submit queries textually from telephones.

Queries from a graphical user interface (GUI) of the user computers 102-106 can originate directly from the user, or like the speech queries, indirectly through a TQSR (Text Query Service Requestor) 120, which may be any software application or device connected via the Internet, for example. As in the speech query, a user may be on a grocery store web site ordering food for delivery and may inquire about a recipe for a special dessert. This recipe query would be forwarded to the query server 118. Any web site, consumer electronics device, or other device may become a TQSR or SQSR for performing a search. For example, a set top box offered by a satellite TV or Cable TV provider could offer the ability to enter a query string and act as a TQSR or SQSR. Any software application running on a PC, such as Microsoft's Word or Excel, may also serve as a TQSR or SQSR.

An appropriate interface, such as a graphical user interlace (GUI) for the computer 102 or speech prompt system in the speech translation system 114 extracts a query from the user and transmits the query to the query server 118.

Upon the receipt of a query, such as from user computer 102 in this example, the query server 118 can provide information (e.g. advertisements) to the user for the user to see or hear while the search is being processed. This information can be related to the query (or to the keywords of the query) and may include visual and audio information as appropriate for the user's device and for the source of the query, such as a grocery store ad in the recipe example. This information can include not only advertisements, but also information such as video, music, games, web links, etc. that will interact with and display for the user while the search is being performed. The information provided may serve as a source of revenue, for example through advertising. If the user views an ad, or clicks on a link, or purchases a product (sometimes referred to as "conversion") related to an advertisement while awaiting results of a search, the database can be updated to reflect additional ad revenue with a credit of points and/or compensation, if appropriate, to the searcher. A digital text, graphics, audio, or video advertisement may be displayed (or played) on a user computer 102 or on a user telephone (112). The particular advertisement selected is or can be based on a weight associated with the advertisement based on single or combined factors such as advertiser contract commitments, bidding price of advertisers, popularity with users, keyword mapping to advertisements, statistical usage (e.g. least recently presented), user demographics, searcher choice of advertisement, etc.

The server 118 processes the arriving queries by determining which searchers are available to search for the information being requested, based upon factors such as the searcher being logged in, searchers who are signed up for a keyword, or category, or the ranking of the searcher based on previous performance.

The server can also determine if this particular query has been queried previously and can send a response to the user with previously obtained search results without necessarily invoking a human searcher.

When no previous query results satisfying, or that may satisfy the query, are available, the server 118 sends the query to one or more of the available searchers over the communication system 107. If the query is a speech query, in addition to sending the text version of the query and the keywords, the speech recording of the query can be transmitted. The human searchers can be located at computer-based searcher tool systems 122-124 and/or speech-enabled computer-based searcher systems 126-128.

A server-chosen searcher (or searchers) reviews the query, including the keywords and any speech recording and decides whether to accept the search. When the searcher accepts the search task, this acceptance may be communicated back to the user who originated the query through the server 118. This may happen automatically or manually. Because some searches may require additional information or clarification, the searcher can send a request for additional information to the user. This can be sent through server 118 or via direct link to the user via the communication system 107. The user replies with a clarification, additional information or a revised query. The searcher then uses the searcher tool system 122-128 to perform a search of publicly or privately available information to produce search results. For example, the searcher may use conventional tools, such as a browser, to access public databases via searches over the World Wide Web or private databases that may be accessible only to the searcher, such as a database of information previously gathered by the searcher, or from results stored on the query server 118 from other searchers, or from databases that require payment for access or even information available to the searcher in non-electronic form, such as a book on the searcher's bookshelf, test results from a personal experiment, etc. The searcher may also submit the search query, or some version of it to an automated search tool such as the Google or AskJeeves systems. The search results, such as an answer, comments by the searcher, web pages, web links, and other query related information, etc. are gathered by the searcher during the search. The results of the search, such as web pages and links which the user can review or use to obtain the information desired, an answer to a question and web pages or links to web pages that support the answer, etc., is transmitted back to the user through the server 118 or directly to the user via the communications system 107. The information returned is typically what the searcher thinks or intends can satisfy the need of the user. The information can include anything that could satisfy the user, including a document, a video, a song, a configuration the, pictures, links, etc.

The results are presented to the user in real-time, associated with the amount of time it takes to find a searcher and do the search. One or more available searchers are preferably identified within 1-15 seconds and the searcher preferably begins the work of performing the search with 1-15 seconds. Depending on the search, the accumulation of relevant results may generally take from a few seconds to a few minutes. The server or search tool may interact with the user automatically every approximately 6 seconds via the chat session (or via the VOIP connection) in order to identify to the user that progress is being made. This might be as simple as a dot typed on the user's screen or a more detailed automated text message. When on a telephone, the user will preferably be hearing or watching an advertisement, but during silent periods, the user interaction may occur via speech such as having the searcher or an automated speech system say, "Please continue to hold while your search is being performed". The searcher may interact with the user, either of his or her own accord or the searcher tool may remind the searcher to give status to the user. The searcher may also send partial results to the user so that the user may begin to preview results. The server 118 stores the query phrase and the search results for matching with future queries.

When the user is at a telephone 110, there are several ways in which results may be returned to the user from the searcher. The results may be conveyed over a real-time VOIP or circuit-switched connection between the user and the searcher. Combined with these speech results, other results may be sent to the telephone via a text-messaging system such as SMS. These other results may be in the form of text, graphics, URLs, audio, or video. The results can be an audio message recorded by the searcher and played to the user. Alternatively, the searcher's message may refer the user to sources where the user can obtain the answer. The results of the searcher can alternatively be digital text that has been converted into audio and played to the user. The results can be an audio message concerning where the digital results, or some other type of results, can be found that are accessible to a user. Text results may be played to the user using speech synthesis or speech reading, as is done with audiobooks. The text may be read aloud in real-time by the same (or different) resources (e.g. the transcribers described above) that are being used to transcribe speech to text. It is possible to utilize the network of searchers 122-128 to perform either transcription of speech to text or the reverse process of converting text to speech. The database can keep track of which searcher resources are capable of providing either of these services, potentially with compensation for said services. Although not preferred, in circumstances where needed the results can be provided by postal service or other courier.

The user at computer 102 or telephone 110 reviews the search results and then does or does not "accept" the results. An acceptance can be in the form of the user moving on to some other pursuit (e.g. logging off of the search site or leaving the system idle), the user actually providing an acceptance by activating ("clicking-on") an acceptance button on the user GUI, the user responding to a request for a user response, such as a pop-up or voice prompt, transmitted to the user computer 102 or telephone 110 by the server 118, the user entering a revised, different or follow-up query, or some other action that indicates the user is satisfied or otherwise found the results useful. The user can register dissatisfaction with the query results by requesting that another searcher perform the search again (typically with the exact same search terms or query), by activating a "try again with same search terms" button or a rejection button on the user GUI, by responding to a request from the server 118, by responding to a voice prompt, or by some other action from the user that indicates dissatisfaction or the desire to "get a second opinion". If the user requests that the search be performed again or expresses dissatisfaction, the system server 118 provides the user's query to a new searcher or searchers.

When the search is accepted or rejected, a searcher database in server 118 is updated to reflect the success rate of the searcher. The number of successful searches (accepted, or not rejected, by the user) for each searcher and the ratio of successful versus total searches for each searcher can be used at an appropriate time to reward the searcher. The reward may be dependent upon other factors such as transferring a query to another searcher, sending advertisements to users, spending additional time on a search, transcribing voice to text, dictating text to voice, or working with particular categories, or keywords.

When a query, which can be a natural language query (e.g. a fully-stated question) or a set of keywords, is transmitted by the source (102, 114, or 120), the server process 150 (see FIG. 2) running on query server 118 receives and updates 151 the database 156 with the query, and source IP address. It is also possible to store other information about the user, such as address, name, etc. for dialogues with the searcher when needed. The server parses the query and generates 152 a set of search keywords that may be looked up in the keyword database. For later correlation of the user, query and the keywords, these may also be linked in the database. In the keyword database, a weighting can be attached to each keyword that determines how influential it is in determining what group of searchers to pick from. At the time that the query is received, the server can also send information, such as an advertisement, to the user computer 102 for display thereon. The advertisement can be linked to one or more of the keywords of the query. The advertisement can alternatively be chosen randomly from an advertisement database. The information sent to the user can also indicate that the system is "finding a searcher". It is also possible to delay the sending of an advertisement until an appropriate searcher is chosen. That searcher may have the option to choose the advertisement that is sent to the user, which might be based upon the query and/or keywords and/or the searcher's assessment of which advertisement to send. This advertisement choice may be accomplished by the searcher predefining which advertisement(s) should be played for a user that is sent to a given searcher for a particular keyword.

The parse operation can also check the query to see if it is a follow-on query to a previously submitted query by this user during this session, for the purpose of having the same searcher handle a follow-on query from the user. This can be determined by checking whether the user has previously received search results in this session and comparing keywords of the previous query to the current query, or by examining a follow-on query flag set by the user's browser or search application if the user chooses to elevate the status of a particular searcher (e.g. by clicking a button that says, "If possible, give me this searcher again if I search in this topic area"). Cookies may be used to store keyword and searcher information on the user's computer or device given that the server may not know the identity of the user. If so, the database 156 can be updated to link the query to the searcher that handled the prior query or preferably to set the rank of this searcher to the highest value temporarily for that user and for a given keyword. If users become more comfortable identifying themselves when searching, then the server can perform the function of linking user and searcher if the user and/or searcher make such a request for a continued connection. As an incentive to the user to provide identifying information such as name, user ID, email address, etc., this option of getting repeat service from well-performing searchers can be offered as an option to the user.

The query is then matched 154 to the previous queries stored in database 156. This database 156, among other things, stores the previous queries (or a subset of previous queries, such as the ones that are still considered relevant to this user, wherein said relevance might pertain to time, location, or subject matter), the corresponding keywords that resulted from the previous queries and the accepted "relevant" results associated with the corresponding keywords and queries. This matching can compare the keywords of the current query with the keywords of previous queries for an exact, partial or fuzzy (highly similar) match. This can result in several previous queries matching the current query. If a match does not occur, the process associated with finding a searcher to perform a search continues (see FIG. 3).

If an exact match occurs 154 the system proceeds 162 to obtain and provide 164 the user with the corresponding search results and possibly a new advertisement (prior to delivering these results or alternately, concurrently to delivering the results.

If it is a fuzzy or partial match, a number of the closest matching previous query phrases, such as the top three, can be transmitted 158 to and displayed for or spoken for the user. The system can also send a new advertisement to the user and await a reply from the user as to whether any of these query phrases are an acceptable substitute for their current query. If the user's reply 160 (for example by clicking on a GUI button or cellphone key to indicate the user wishes to proceed with the original phrasing of the query) indicates that none of the "matching" queries is preferable to the user over the user's original query, then the process associated with finding a searcher to perform a search continues 192.

If the user has selected 160 one of the queries as a substitute for their query, the system obtains 162 the results from the database 156 and transmits 164 the results to the user without delay (or the system can be configured to present an ad sometimes or always). If the results are accepted by the current user (i.e. considered relevant again), the searcher who produced the results is given additional credit, which is stored in the searcher database. The query results are kept in the database if users continue to find the results relevant. If a certain threshold (configurable at the system level) of users consider the results not relevant or not satisfactory, then the results are no longer offered to future users (and the results might be deleted from the database).

Figure 3:
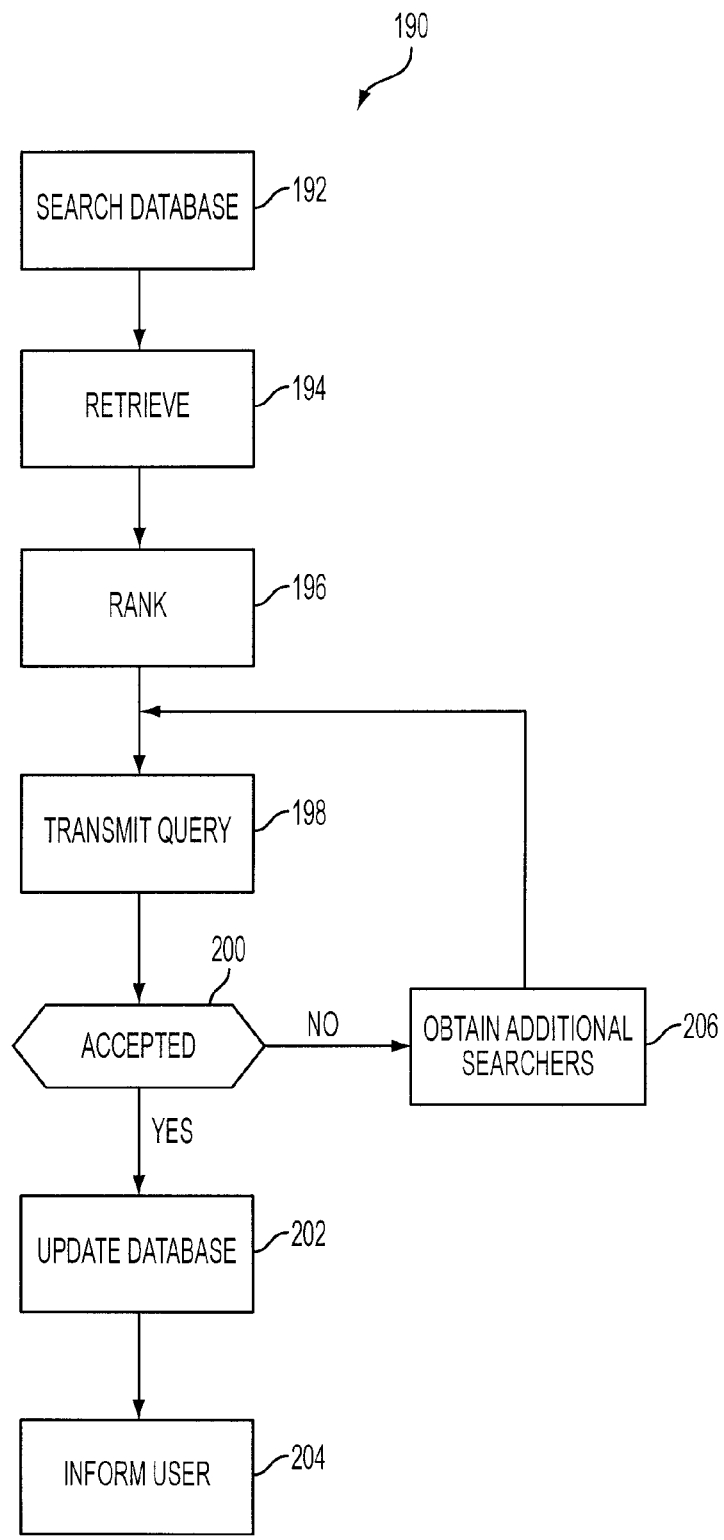
FIG. 3 depicts finding a searcher.

If the query does not result in the use of previous search results, the process 190 of FIG. 3 continues and the keyword(s) of the current query are used to search 192 the database 156 for keyphrases that match. At this time, the keywords can also be sent to a conventional search engine, such as Google™, to have a conventional search performed, the results of which are passed to the searcher accepting the search. In the database search 192, for each keyword match, corresponding database entries, such as searcher identifiers, searcher success rate, availability, etc. are retrieved 194. The keywords found in the database access can be ranked according to the importance they should carry in a search query phrase.

Figure 3A:
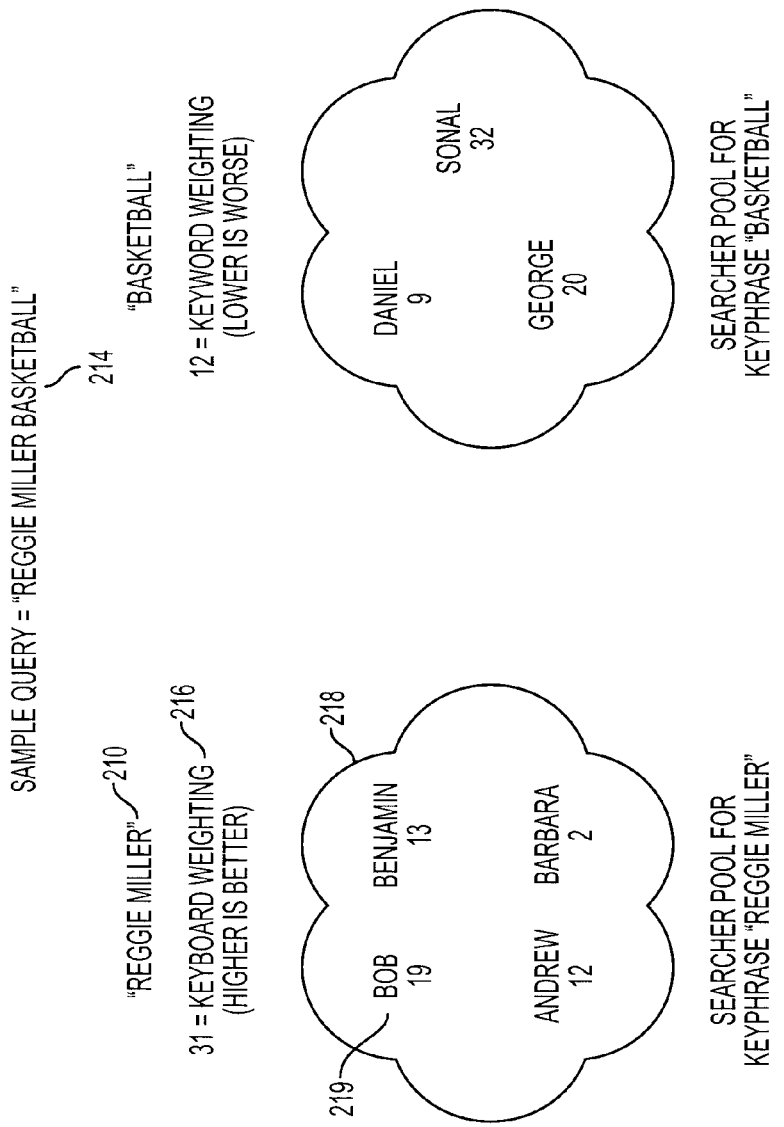
FIG. 3A illustrates how a searcher is picked.

In this ranking a keyword such as "Reggie Miller" 210 (see FIG. 3A) might be ranked higher than a keyword such as "basketball" 212 because "Reggie Miller" is more specific. Therefore, generally, if a searcher has signed up for a more specific keyword, then it is an object of this invention to have the more targeted searcher responding to the user's request. Hence, in a query such as "reggie miller basketball" 214, a searcher would be selected based on the higher ranking keyword 216 of the query, which is a searcher who has signed up for the "reggie miller" keyword, and therefore should have more targeted domain-specific knowledge about Reggie Miller than a searcher who signed up for the keyword "basketball". (An automated mechanism for ranking keywords is described in a paragraph below.) Within the searcher pool 218 for a keyword, the searcher with the highest rank 219 would be chosen by the query server 118 to receive the query. Also, words such as "a", "an", "the", "is", "what", "why", "how" might be given a low keyword importance rating.

In any event, if there are multiple searchers in the pool representing the highest-ranking keyword 210 for the query, then the highest ranked searcher 219 of that pool 218 is selected first. The list of available searchers is sorted 196 according to one or more of the number of keywords of the query that match corresponding keywords of the searchers, keyword rank, searcher rank, the success rating of the searchers, etc.

If a searcher is signed up for multiple keywords in a query, (e.g. a searcher might be signed up for both "baseball" and "world series"), then that keyword searcher may take priority over fewer-keyword searcher candidates who are only signed up for fewer matching keywords in the search query phrase (e.g. a searcher who is signed up for either "baseball" or "world series" but not both).

If the query is a follow-on query (and the user has indicated a desire to have this searcher help with future searches in a particular keyword category), the "legacy searcher" should be ranked the highest in the list. For the top ranked searcher, the query, including keywords, etc. is sent 198 (see FIG. 3) to his or her searcher tool system, for example system 122 or 128. An alternative implementation could send the query to multiple searchers 122-128 simultaneously to determine which available searcher will respond to the query most quickly. And similar to a game show, the first person to hit the "I'll handle the search" or "Accept" 552 button "wins" the search. Or, alternatively, multiple searchers could actually do all the searching work and multiple searchers' results could be returned to the user (even with multiple chat sessions between the user and multiple searcher(s) still enabling clarification, etc.). If one or more keywords are not found in the database

156, the database is updated to include them and they are linked to the query. Searchers can sign up for those keywords in the future.

If no searcher is identified for a query phrase, then the server can either forward the query to "generalist searchers" who will attempt to answer queries in any category. Alternatively, the system will shuttle the query to another search engine and/or meta-search engine in an attempt to provide the user with a base level of functionality that is never worse than other search engines. The results are passed back to the user. Also, the query may be passed to a system of experts who answer questions on a website such as Google Answers or Yahoo Answers, and the user may be given a pointer to the location of the query which may be answered in the future. These systems may not give real-time feedback, but the user may check back in the future.

Given that the system has stored the keywords, searchers can sign up for those keywords in the future. The keyword database can be inspected by searchers to determine the ranking, traffic, and searchers related to particular keywords, which can further inform (arid possibly motivate) searchers about signing up for keywords.

If the search is accepted 200 (FIG. 3) by one (or more) of the searchers, the database is updated 202 to link the searcher to the query, etc., indicate the searcher is unavailable while handling this particular query, etc. In the case where the query is sent to multiple searchers, it is possible to configure the system to inform all of the contacted searchers, except the first to accept the query, that the query has been accepted by another searcher and indicate that they should discontinue their searching. These searchers are made "available" to other users' queries. Alternatively, it is also possible to let the searchers who have accepted the query continue their search. If at least one searcher is working on the search, a message is then sent 204 to the user that indicates that the search is "in progress". This message can also be accompanied by other information, such as an advertisement. This advertisement can be one selected by the query server 118 or one selected by the searcher based on the query (and/or keywords) accepted for searching. If an advertisement suggested by the searcher is sent to the user, the database is updated to (optionally) credit the searcher for the advertisement being sent to the user.

In the case where individual searchers are attempted sequentially and the currently-selected searcher does not accept the search (either by pressing a button to "reject" or by not responding within a (configurable) short period of time such as 6-18 seconds), the next highest ranked searcher is obtained 206 from the list and the query is sent 198 to this next searcher. Since it may take more time than the user is expecting to find a searcher in this situation, the server 118 can also send additional information to the user, such as a game, a video or another advertisement such as an interactive advertisement. In any event, the user is or can be updated periodically to be made aware of the search progress.

If a searcher does not feel qualified to conduct a search that was sent to him/her, then it is generally better for the searcher to do a "transfer to another searcher" to expeditiously get the user better results from another qualified searcher. This creates a better user experience. The searcher may be compensated in some way for choosing to transfer the question to another searcher. In some cases, that compensation for the original searcher may be gated by the success of the next searcher. However, if the search is handed off more than a preset number of times (e.g. 3 times), then the server preferably will return the "default" answer of one of the top search engines for this query string. This ensures that the user is receiving no worse results than using one of the top search engines. The user may be able to select which search engine is used as the "default". This information may be stored on the user's local system (e.g. as a cookie) or if the user is "logged in" to the server, then user profile information may be kept there. A gift certificate or prize may be awarded in this case in order to encourage the user to continue using this human-assisted search engine even though the human element of the search was not readily available for this particular search. As mentioned already, the query may also be passed to a question/answer website such as Google Answers or Yahoo Answers for an eventual answer to the query from an "expert" from those websites. The user would be given a link to the query at the other website.

If the end of the list (206) of potential searchers is reached, the system can check for additional searchers that have become available since the query was received and send them the query or can send the query to an available searcher who has registered for general searches. Alternatively, the system can use a variety of mechanisms such as using thesaurus-like relationships between words to send the user to a searcher that is signed up for a keyword pool that is deemed closest to the user-entered keyword. The system may be configured to set the threshold for the degree of closeness of the user-entered keyword versus the search pool associated with a similar keyword. And as noted above, the results from a search engine can also be provided.

Figure 4:
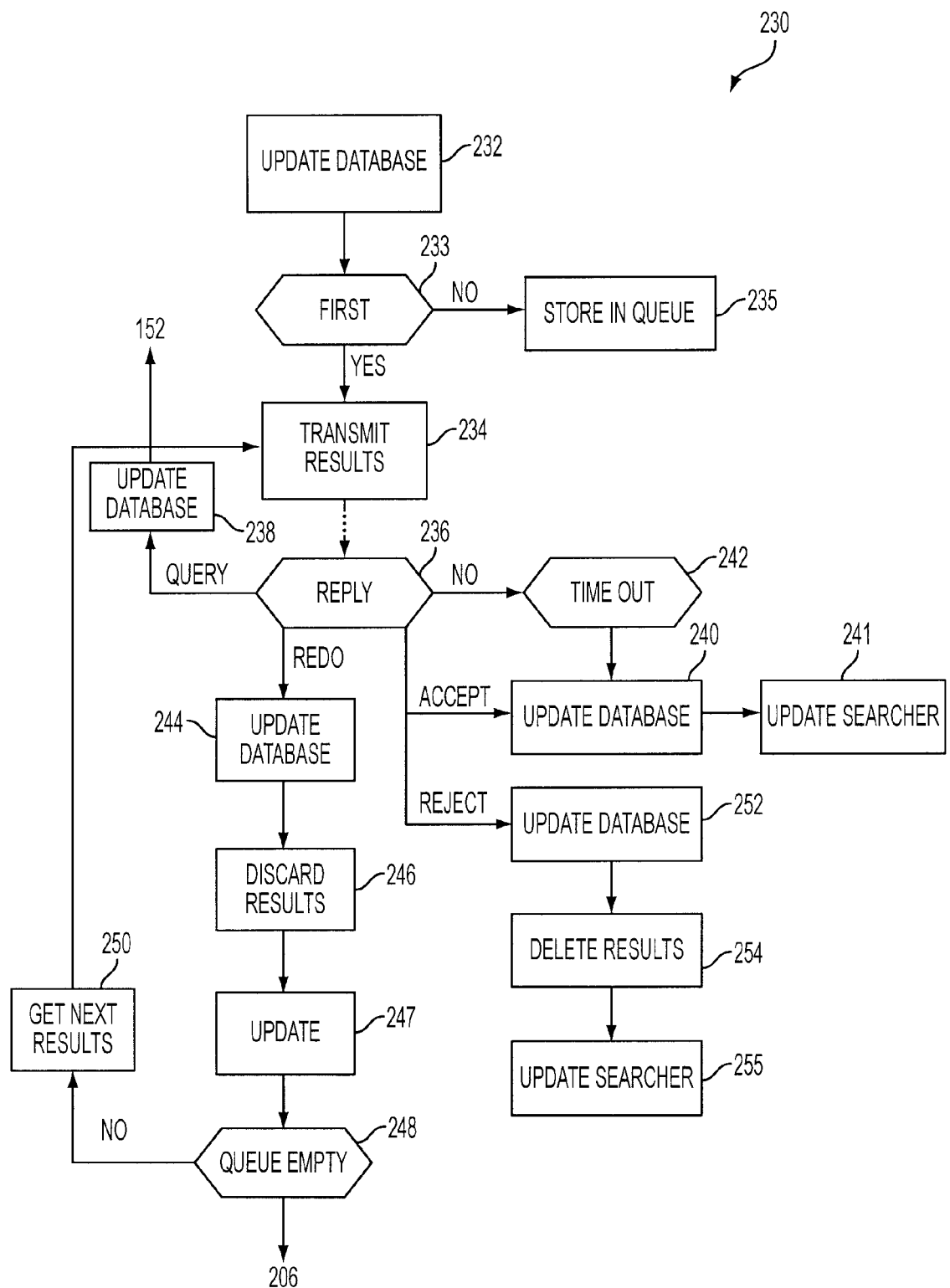
FIG. 4 illustrates search result processing.

When search results are received from a searcher, the database 156 is updated 232 (FIG. 4) to store the results linked to the keywords, the query, the searcher, the time required for the search, etc. and the results. If the system has been configured to allow multiple simultaneous searches based on a query, and if this is a first set of search results 233, the results are transmitted 234 to the user (which is the case when the query is sent to only one searcher). For the telephone-based user this may involve converting the results into audio information or transmitting the information to the user via a text message (or mail), or both. The transmitted text, audio or mail can also include an advertisement linked to the keywords or selected by the searcher.

If it is the second set of search results, the search results can be temporarily stored 235 in a push down type results queue and the second replying searcher notified that their results are in a results waiting queue.

Figure 2:
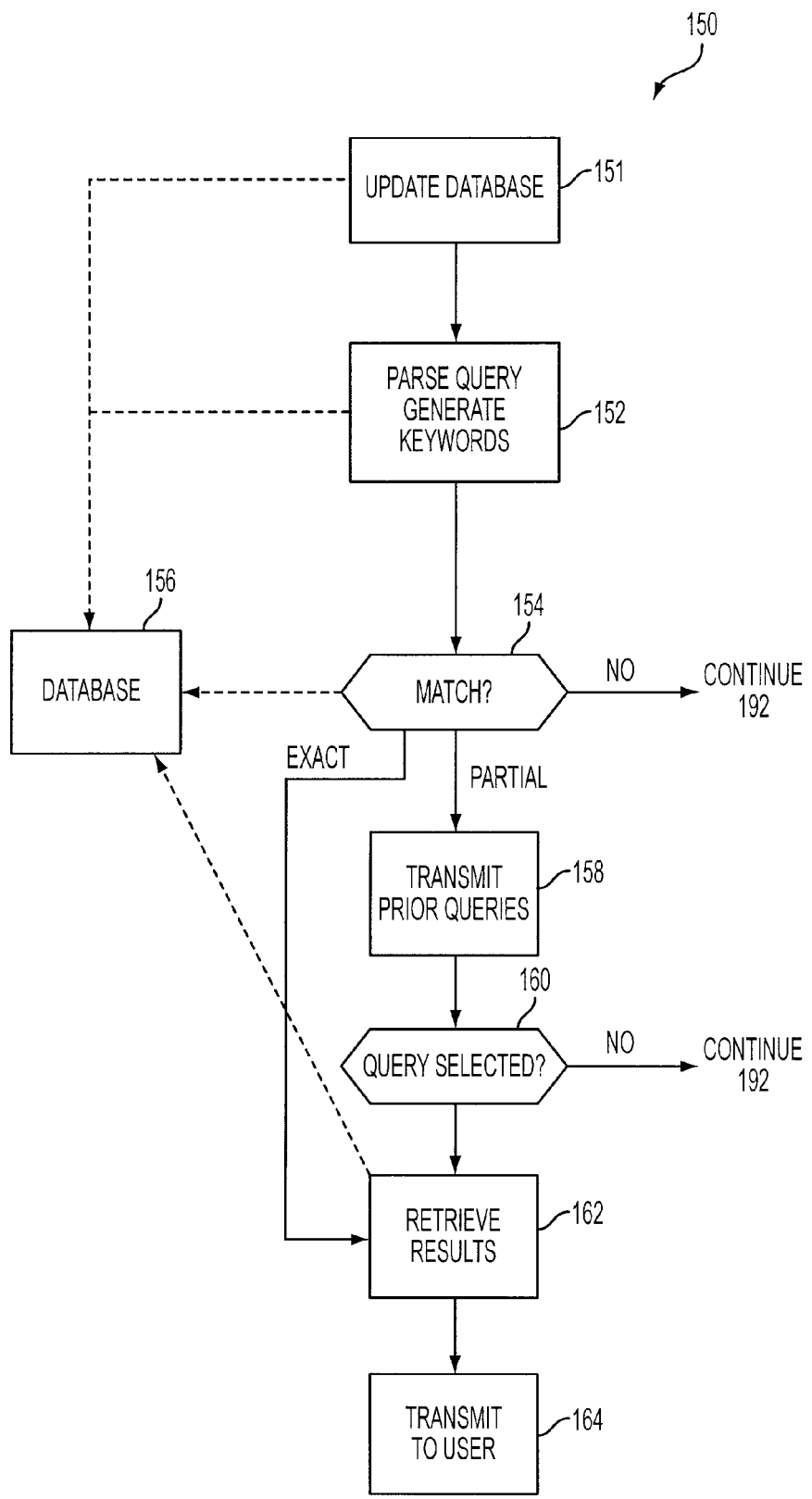
FIG. 2 shows operations associated with reviewing prior queries.

If any result is returned, the system then waits for a reply 236. If the reply is that the user wishes to perform an entirely new query, the database 156 is updated 238 to reflect a successful search and the processes of FIGS. 2 and 3 are executed for the new query. This update updates the query, keywords, results and credit to the searcher.

If the reply is an explicit acceptance, such as the user clicking the accept button of the user GUI or the user logs out of the search system, the system updates 249 the database, deletes the contents of the queue, etc. The user can also be sent a message thanking the user for using the system and one or more advertisements linked to the search results. The human searcher is notified of the user's acceptance of the results.

If the period for a reply times-out 242, indicating that the user has moved on, the system updates 240 the database 156 to reflect a successful search. The database entry for the human searcher is updated 241 about the successful search. That is, the database 156 is updated to reflect a successful search having been accomplished by this human searcher (allowing the human searcher to be credited "points"), linking the stored successful search results with the searcher and the query, keywords, etc. The human searcher may be notified that the user has accepted the results by default.

If the reply indicates that the user is requesting that the search be redone with the same query, the database is updated 244 to reflect an unsuccessful search, the search results are deleted 246 (or at a minimum, made unavailable in future searches although the results may be kept for auditing purposes) and the database entry for the searcher is updated to reflect that the search was unsatisfactory for the user. The original searcher is notified that the results were not acceptable. Another searcher is engaged to perform a search for the query. This redo reply can also result in the system sending the user machine 202 a message indicating the system is redoing the search, and information to entertain or engage the user, such as a video clip of a popular comedy or an advertisement that includes a discount coupon. This update 244 updates the total number of searches by this searcher without updating the number of successful searches, deletes (or marks them as not to be used) the search results of this search, etc. If other search results are stored in the queue 248, the next entry is taken from the queue 250 and transmitted 234. If no results are stored in the queue, the system accesses 206 the searcher list at the query server 118 for additional searchers and transmits 198 the query to the next-highest-ranked searcher (or set of searchers).

If the reply is simply rejected, the database is updated 252 to reflect an unsuccessful search, the results are discarded 254 and the database entry for the searcher is updated 255 about the rejected search. That is, the total number of searches for this human searcher is updated without updating the successful search total; any comments provided by the user are linked to the searcher, etc. The human searcher may also be notified. The system can reply with a message apologizing for the failure and some sort of inducement to use the system again, such as a free popular video, song, game, discount coupon, etc. A default set of results can be sent to the user from one of the top-ranked search engines using the user's original query. The user may be able to specify what "default search engine" should be used in such cases.

Figure 5:
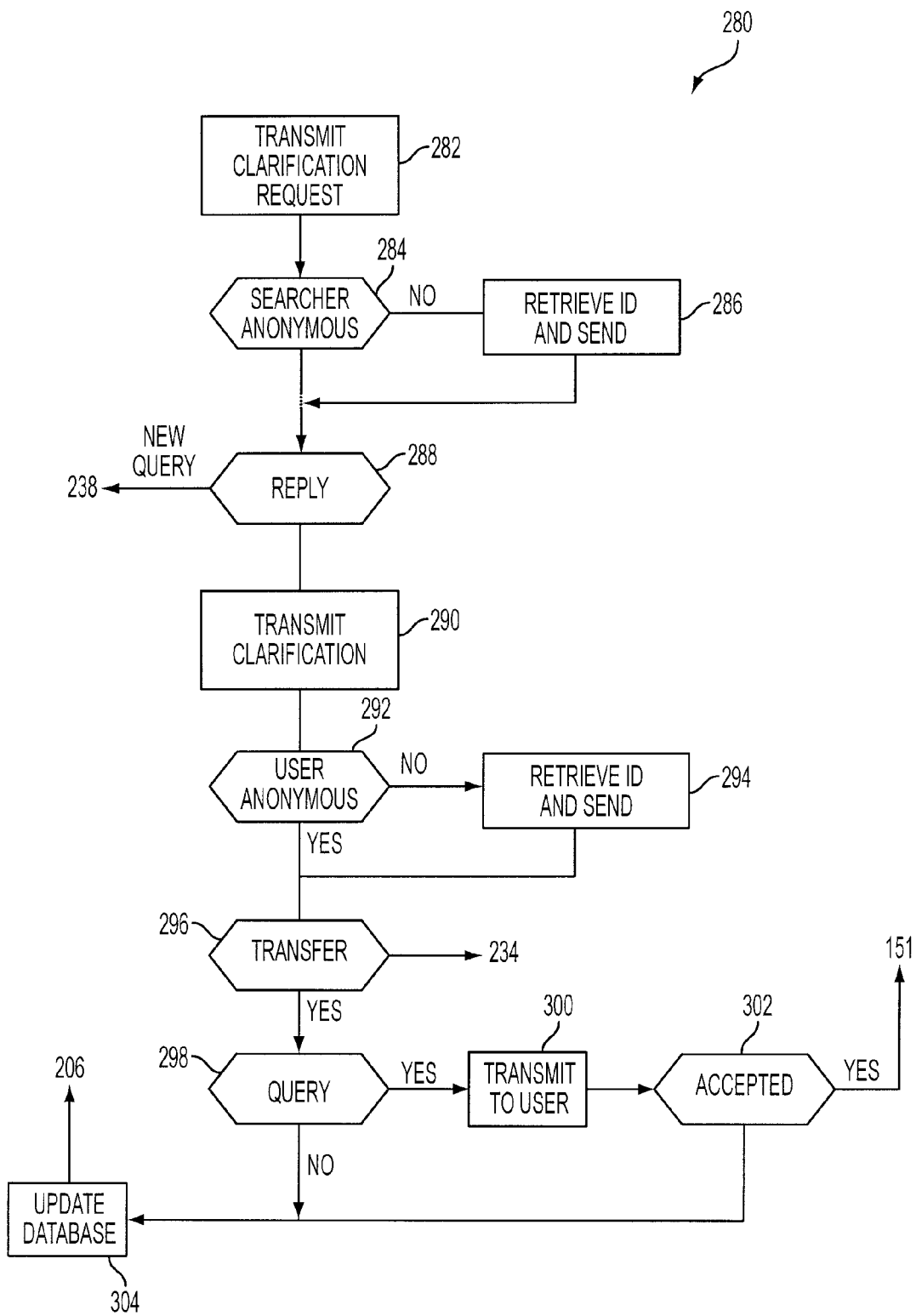
FIG. 5 shows query clarification operations.

When a clarification request is received from a searcher, such as searcher tool system 122, the clarification request is transmitted 282 (FIG. 5) to the user, such as to system 102. This request can also be sent to other searchers who have accepted the query. The clarification request can be in the form of a digital message, such as an instant message (IM) or even an audio message, using a VOIP (Voice Over Internet Protocol) connection or using a speech message packet that can be played by a user computer or telephone, for example. The system also checks the request and the database 156 to determine 284 whether the searcher desires to remain anonymous. If not, the searcher identity (email address, name, etc.) is retrieved 286 from the database 156 and transmitted 286 to the user.

The system then awaits a reply 288 from the user. The reply can be a newly constructed query and the system is updated 238 (FIG. 4), which invokes the process of finding a new searcher for the new query. However, the system is monitoring to see if a reformulated query is submitted by the user that may cause the query server to send the new query to the same searcher.

If the searcher receives the new query and determines that this new query is outside his/her realm, the searcher can "transfer" the query to another searcher, which sends the query back to the server to find another searcher based on keywords, etc. . . . (In general, the searcher may, at any time, choose to transfer the query to another searcher, which invokes a process as described further below).

The user reply can be a message that provides additional explanation to the searcher. This clarification message is transmitted 290 to the searcher. If multiple searchers have accepted the query, the system can provide the clarification to all searchers. In fact, the system may provide the entire chat interaction to all participants (i.e. the user and one or more searchers). The system then checks 292 the original query and the database 156 to see if the user desires to remain anonymous and, if not, the user's address is also sent 294 to the searcher. The system then awaits the results of a search or another clarification request. The system can allow the user and searcher to communicate independently for further clarification when they do not remain anonymous or all requests can be routed through the server 118 either anonymously or fully identified or partially identified.

The searcher, once clarification is obtained can recognize that the query is out of the searcher's search expertise and the searcher can indicate that the clarified query should be transferred to another searcher. As part of the transfer, the searcher can clarify the query for the next searcher (and for the user). The system, when such a transfer request is received 296, checks 298 to see if the transfer includes a searcher suggested query. If so, it is transmitted 300 to the user and displayed as a revised query in the query frame or as a revised query in the clarification request/answer frames of the user GUI. The query is used to update the database, which includes removing the link between the query and the searcher. Alternatively, the user may be allowed to approve 302 the modified query before it invokes a new search with the modified query. The searcher is permitted to transfer a query without incurring an update to the searcher's statistics that indicate the searcher did not produce successful search results. That is, a searcher is not penalized for recognizing that they cannot handle the query. The searcher has an incentive to pass along a query when he or she does not feel qualified to perform a given search. If the user does not accept the revised query or the searcher did not produce one, the database is updated 304 to mark the query as a transferred query, the link to the searcher is removed and the list of searchers is accessed 206 to find another searcher or set of searchers using the previously described process. In this event, the searcher is also not penalized. When the search is transferred, all of the "instant message" or "chat" interaction of the first searcher is transferred to the subsequent searcher so that there is history and context that does not need to be repeated between the user and searcher.

Figure 10A:
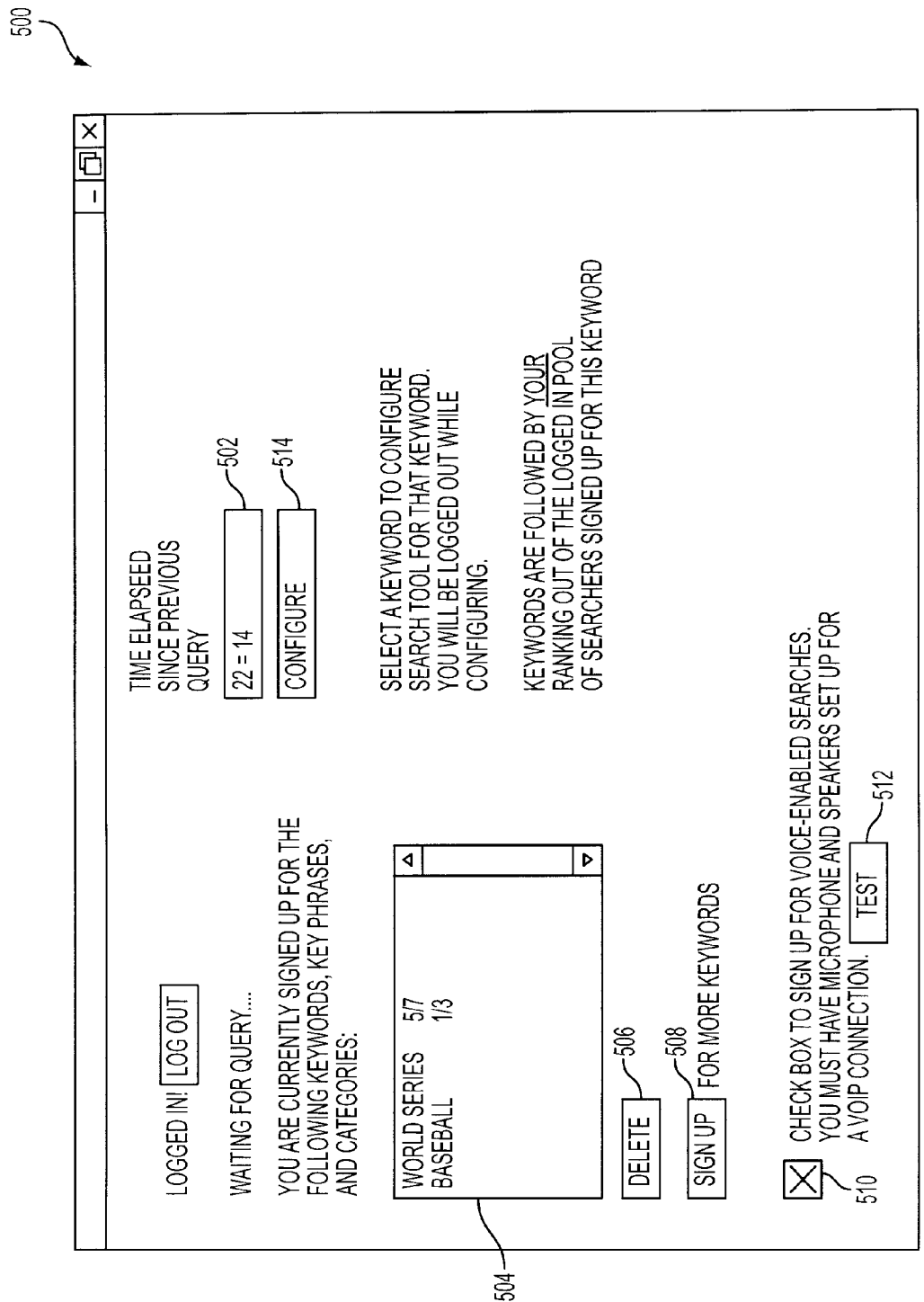
Figure 10B:
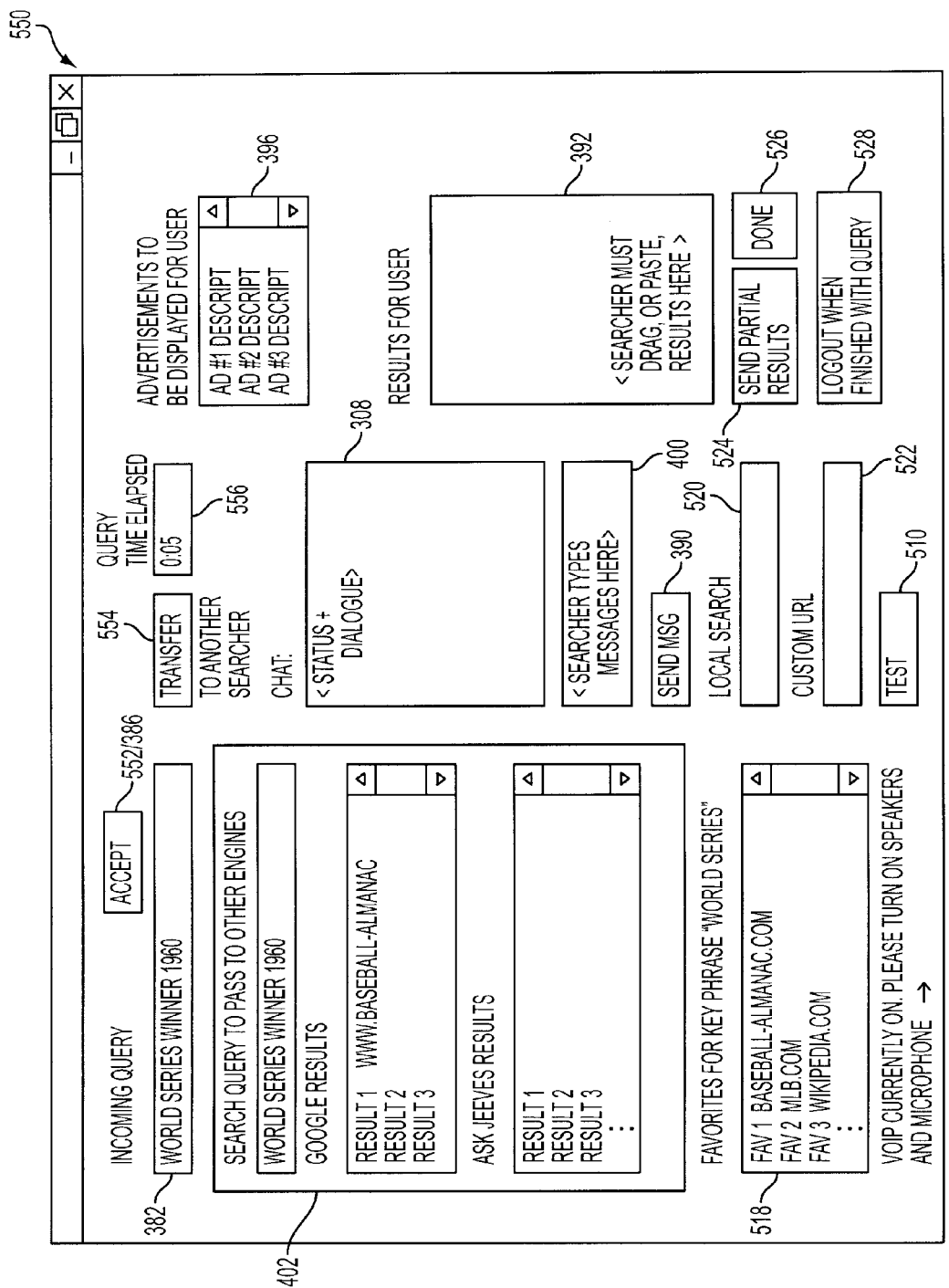

When the "old" searcher has decided to transfer to a new searcher, the old searcher hits a "transfer" button 554 on the searcher tool screen 550 (see FIG. 10B). The searcher may transfer the search to another searcher by selecting the keyword that seems most likely to have searchers that will know the answer to the user's query. In other words, a human can determine what seems to be the most relevant keyword in the search query. When the searcher clicks the "transfer" button 554, a new display 650 (see FIG. 10D) allows the searcher to perform the transfer operation. The query string is presented to the searcher 652 with all pertinent keywords displayed below the query string. For the example query of "world series winner 1960", there might be keywords 653 "world", "series", "winner", "1960", "world series", and "world series winner" that searchers might have signed up for. By selecting keyword "world series winner", the human searcher will likely select a searcher out of a pool 656 of two currently logged-in "world series winner" searchers who seem perhaps most qualified to find relevant results regarding winners of the World Series. By selecting this button 654, the human searcher effects a transfer to this new searcher pool. When choosing a searcher that is most likely able to give good results, the original searcher may also be rewarded if the subsequent search is considered successful by the user. The searchers are obtained 206 from the pool and the query is transmitted 198 to the searchers.

This "transfer" capability can be used to give keywords their ranking (see above regarding importance of having a ranking for keywords in order to choose which pool of searchers to choose from during the initial routing of a query to an appropriate searcher). If the initial searcher (associated with an initial keyword) picks another keyword to send with this query, then the weighting of the initial keyword decreases and the importance of the new keyword increases. Therefore, over time, when these two keywords show up in the same query phrase, the higher-weighted keyword selects for the searcher pool that will get the initial attempt to perform the search. The weighting can be kept on a global basis, decrementing and incrementing the weightings no matter what are the keyword pairings. An alternative approach that takes more resources but provides better results is to store keyword pairs and monitor the weighting just within that specific pairing. An example of this might be, "How many police helicopter pilots are there in the NYC area?" which might initially trigger a search performed by a searcher who has signed up for the "police" keyword. However, over time, it might be that those searchers do not feel competent to deliver an answer so they transfer to searchers linked to the "helicopter" keyword or "helicopter pilot" keyphrase keyword. Over time, the later words become higher weighted so that such a search would go to the "helicopter pilot" searchers first, rather than starting with the "police" searchers. The initial keyword weightings may be assigned based on keyword or word frequency of occurrence in web documents, search queries from other search engines, etc.

When a transfer of a query occurs, the system can send a message to the user that another searcher is being sought to handle the query in order to give the user better service. Of course, new information to entertain and/or engage the user, such as a different advertisement can also be sent.

By having the system facilitate a dialog between the searcher and the user through these operations allows the user to receive a higher quality and more rewarding search experience. And the dialog allows the user to guide the searcher so that a better search result can be produced. The dialog is preferably conducted through the server 118 or, alternatively, by a mechanism such as instant messaging directly between two computers, telephones, or devices (or using a different server than the one provided by this service). The dialog may also occur via mechanisms such as VOIP, circuit-switched voice networks, or voice packet networks.

When the end of a billing period is reached, the server accesses the database 156 to obtain information associated with the success of the searchers (e.g. relevance of the results to the end user), the number of advertisements, advertisements hand-selected by the searcher, the speed of response, etc. and applies a formula that takes these factors into account in order to compute a remuneration for the searcher. The server also applies a formula to compute the advertising cost for the advertisement (paid by the advertiser) that can take into account the number of times an advertisement has been presented, the length of time the user watched the ad, whether the user "clicked through" the ad, whether the user bought products or services from the advertiser's website (this information may be delivered back to the server from the advertiser), etc. Appropriate payments to searchers and bills to advertisers are then sent out. Searchers may receive their payment via an "account" on the system until the searcher asks for a payout, which might occur via any form of payment or the searcher may chose to spend their points or dollars on products that are offered via the search tool system.

Figure 6:
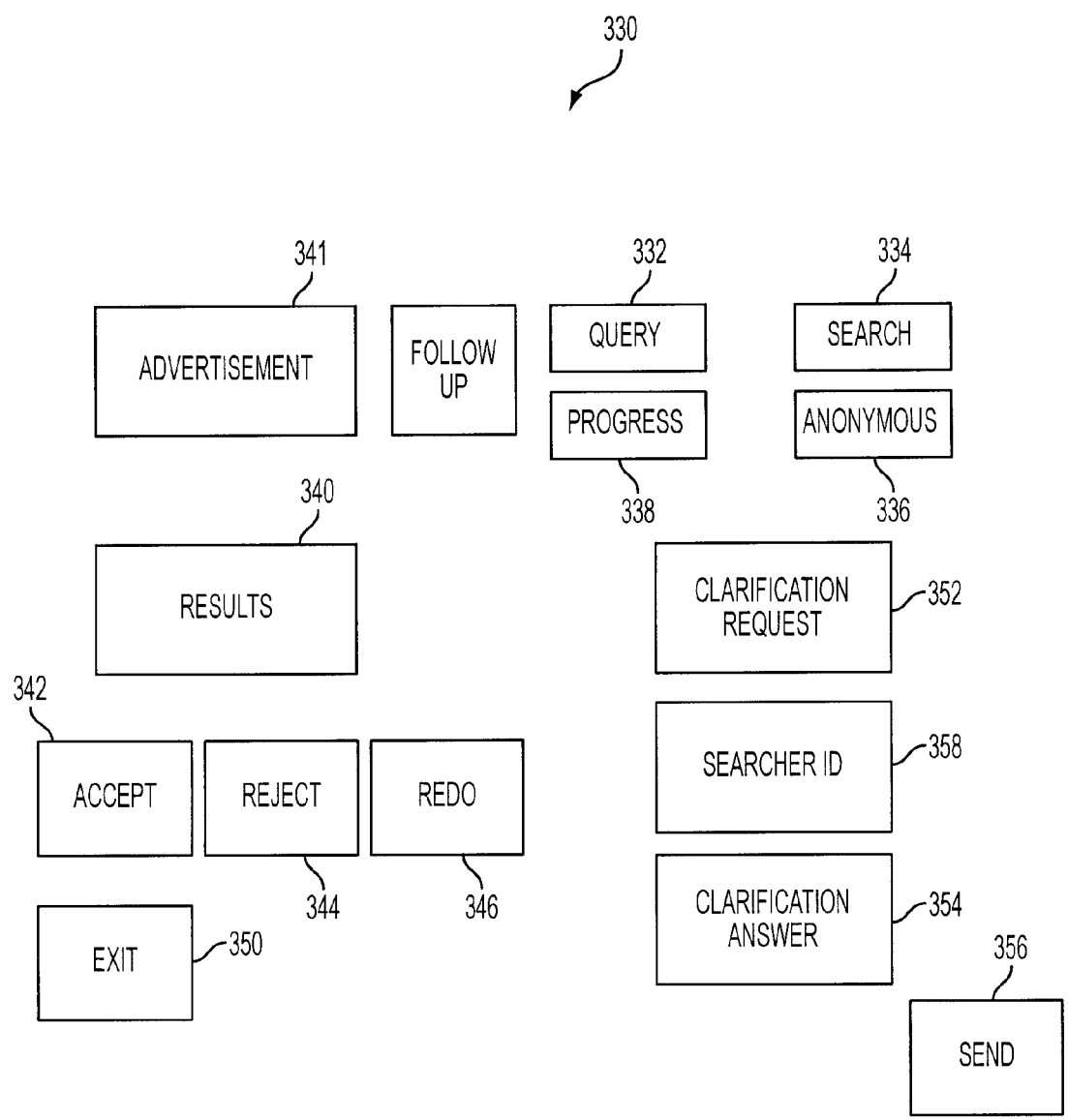
FIG. 6 depicts a user GUI (graphical user interface).
Figure 9A:
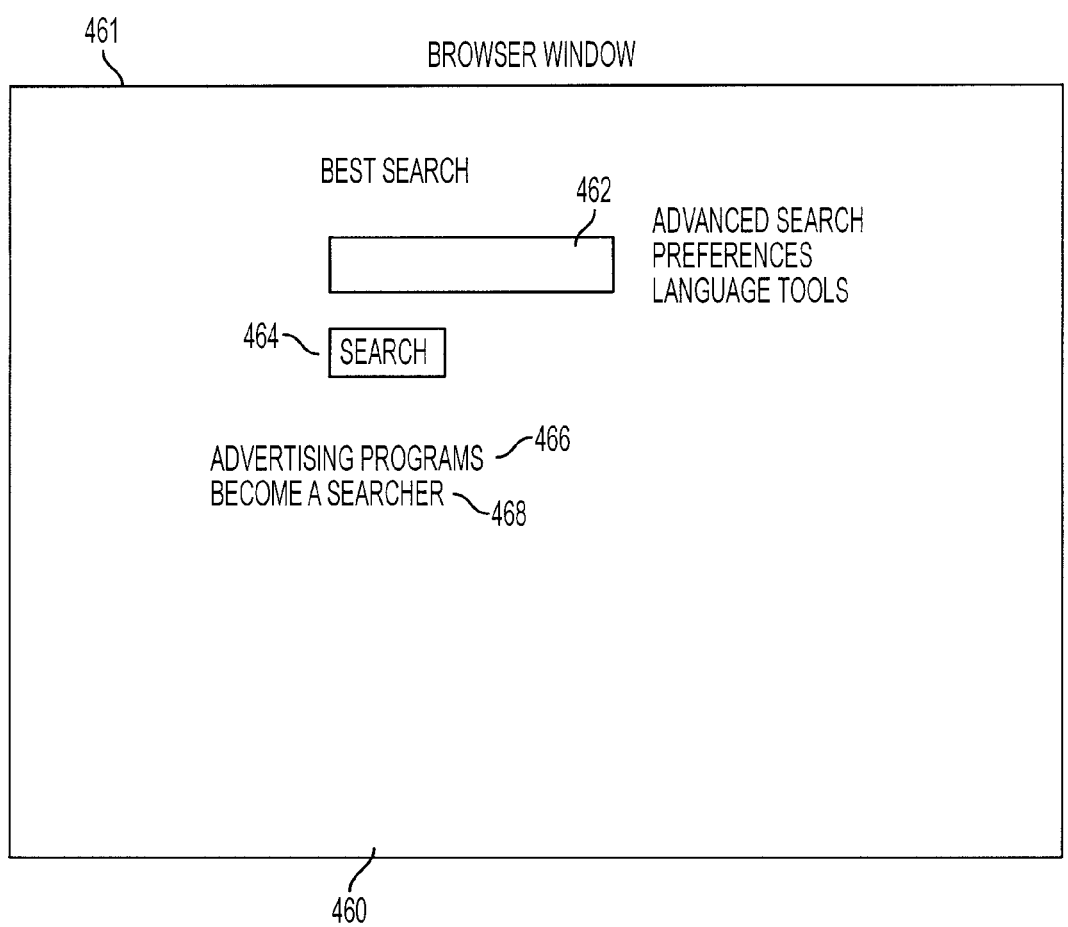
FIGS. 9A, 9B, and 9C show different phases of the user GUI during a search session.
Figure 9B:
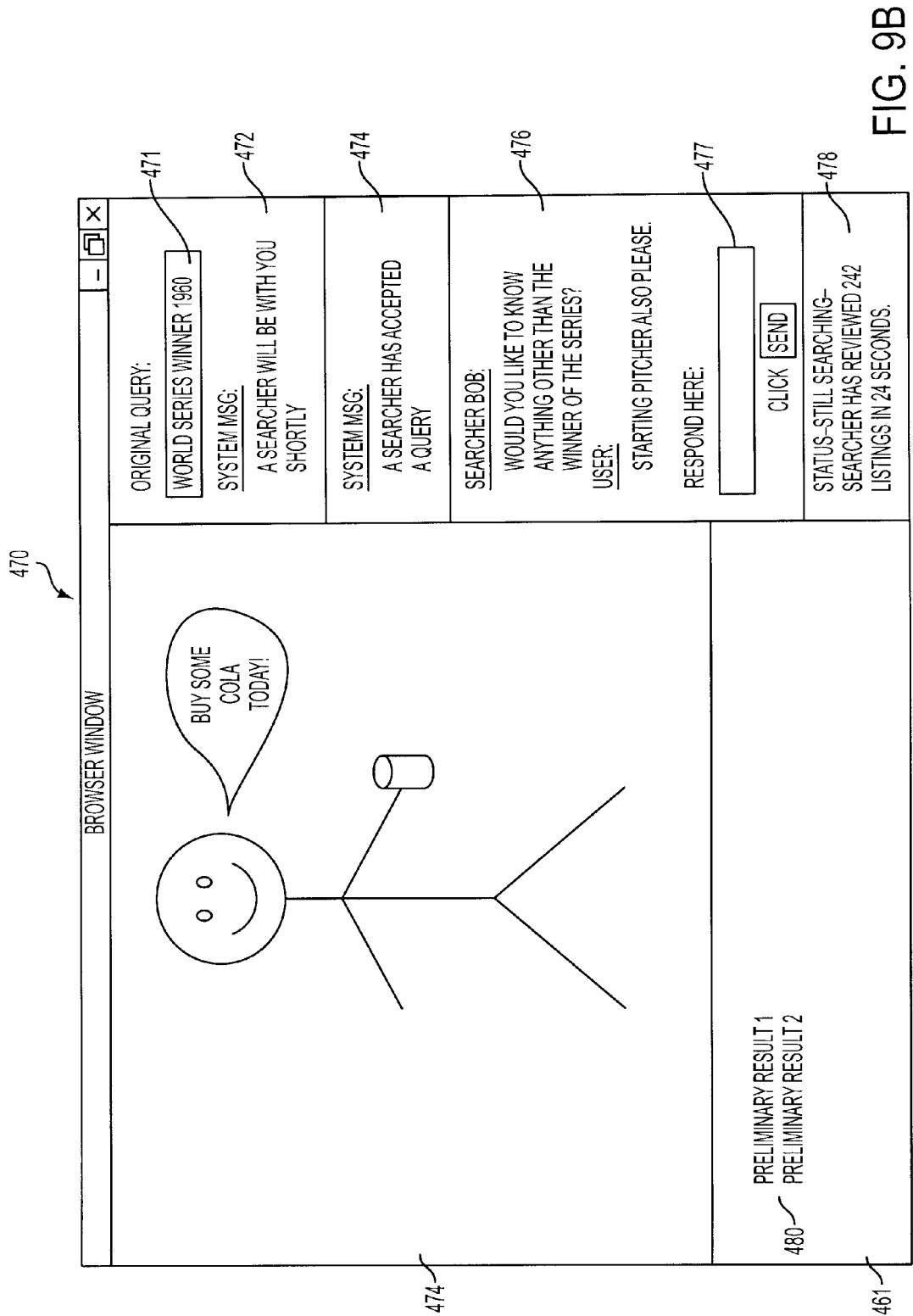
Figure 9C:
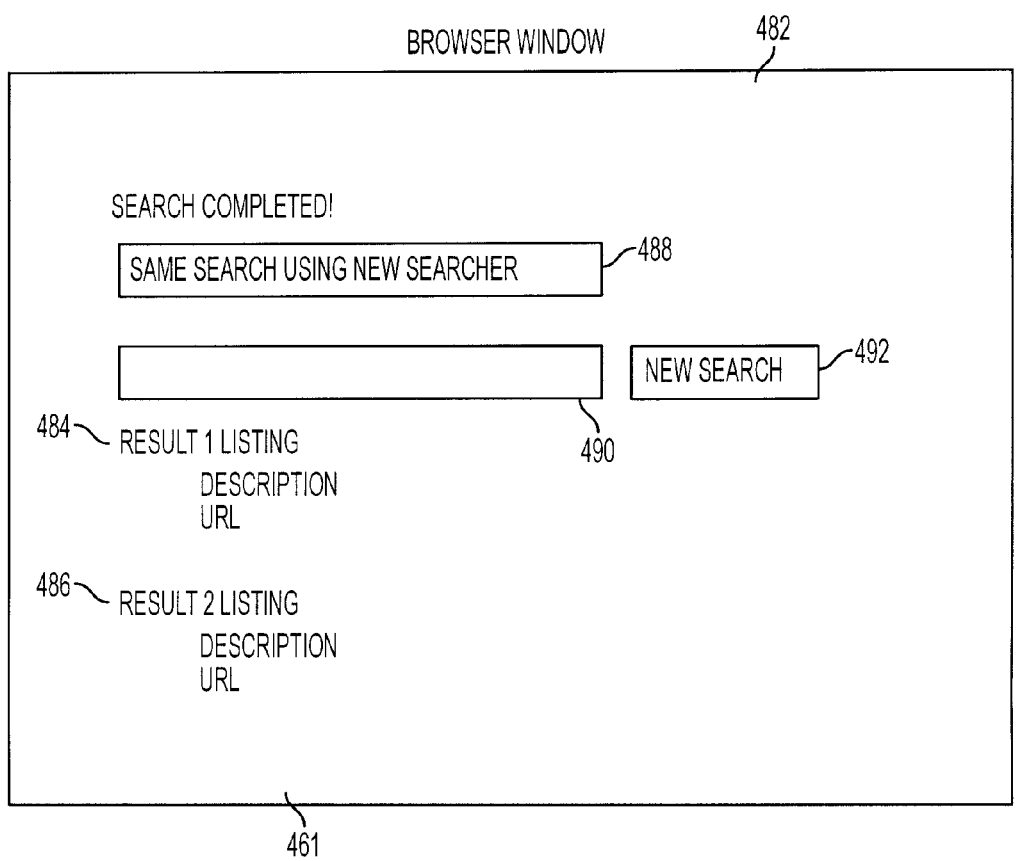

A user system, such as system 102, presents the user with a GUI 330 the basic components of which are depicted in FIG. 6 while FIGS. 9A-9C show a possible layout other components and an example of use. The components of the GUI 330 include a frame (or field/window) for a query 332 and a control or button 334 to start a search. The user can also activate a button 336 to signify that they do not want to remain anonymous to the searcher, which prompts the user to login or to setup an account so that logins are possible. A progress frame 338 can be used to update the user concerning the progress of the search. A results frame 340 displays the results of the search and buttons are provided for accepting (342), rejecting (344) and redoing (346) the search. The text of the accept button 342 may say "Would you like to do the exact search again with a new searcher?" and the buttons 344 and 346 may be eliminated. An information frame 341 can also be provided for the information, such as an advertisement, provided to the user during the stages of the search or the result frame 341 can be used for the presentation of the information (e.g. an advertisement). An exit button 350 is also provided which can result in log-off from the search system. When the searcher requests clarification, the request is presented in frame 352 and the user can enter the clarification in frame 354. The user sends the clarification by activating a send button 356 or by simply hitting "enter" on a PC keyboard, as would be done with a chat session. The searcher identification can also appear in frame 358. Alternatively, both the user's and searcher's comments may appear in the same frame, similar to the way many chat services are structured, designating each person's comments via a tag which could be their real identity, a user ID, or a temporary ID.

The GUI 330 has an associated GUI data structure or database (not shown) that stores the contents of each of the buttons and frames or fields. For example, the data structure can store a flag indicating whether the user is anonymous, whether a search has been requested, the contents of the clarification request frame, the content of the results frame, etc. This data structure is essentially duplicated in the database 156 of the server 118 and when the database in the server is updated, the content of the GUI data structure and GUI can also be updated. The entire contents of the GUI data structure can be transmitted to the server 118 each time a user activates a button and the server responds with an update to the GUI data structure (and GUI). The entire contents of the GUI data structure can also be updated when events occur at the server, such as when an advertisement is to be displayed. Alternatively and preferably, to keep the user GUI simple, the system can only provide the frames and buttons, as they are needed. For example, until a clarification request is made, the GUI need not display the frames 352/354 and button 356. To minimize any visual overload that may be presented by the GUI and keep the presentation to the user simple when they first come to the website, only the search query frame 332 and the "search" button 334 may be initially presented to the user along with a minimal amount of text such as the title of the company (also see FIG. 9A). Once the user has entered the query, then other frames may appear on the display such as the advertisement 341, progress indication 338, and the chat or clarification elements 352, 358, 354, 356 (also see FIG. 9B). When the results are sent back, the results frame 340 may open and either share space on the display or take the place of, the advertisement. The buttons such as 342, 344, and 346 might appear along with the results (also see FIG. 9C). The exit button 350 and the identify (or login or "anonymous") button 336 may be displayed for the user, depending on the service implementation.

Figure 7:
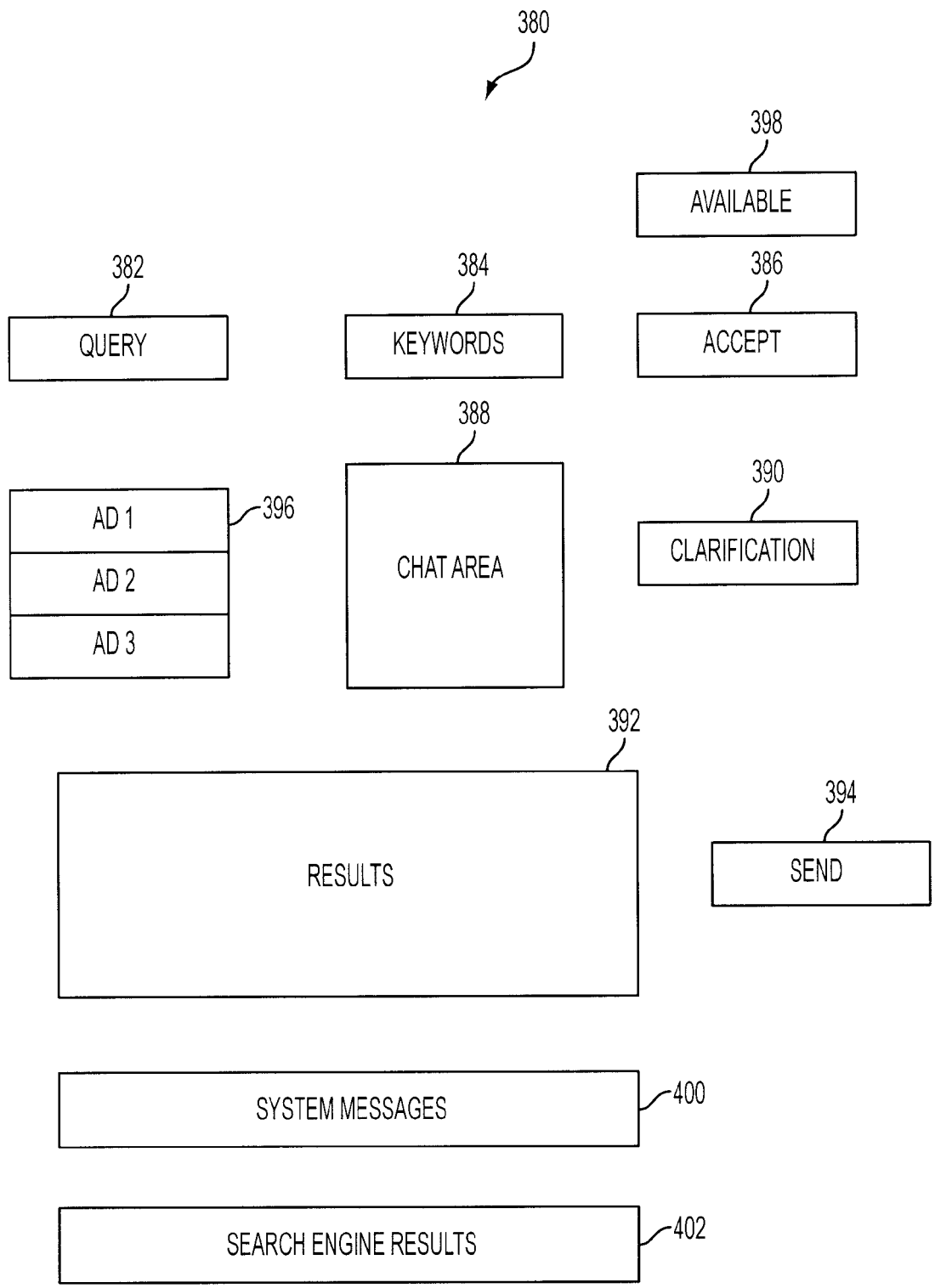
FIG. 7 depicts a searcher GUI.

The searcher tool system 122 incorporates a more sophisticated GUI 380 and associated data structure. The components of the GUI are depicted in FIG. 7 while a possible layout of the basic components shown and others among screens are depicted in FIGS. 10A-10E. The GUI 380 allows the searcher to review a query in a query frame 382 accept the query via a "accept" button 386, request clarification via a "chat" area 388 of the display and a "send" button 390 to send a message to get clarification from the user. The searcher can also drag/drop/paste search results with text, pages, links etc. into a search result area 392 send the results via button 394, select or designate an appropriate advertisement for a query from an advertisement list that can be correlated to keywords or results. The searcher can also indicate availability ("logged in and accepting queries" or not) via the "available" button 398 and receive system messages in frame 400 such as that other searchers have also accepted the query, the status of the results from other search engines or websites where the query has been passed, the statistics of the searcher such as the success rate, keywords registered by the searcher in the database 156. The GUI can also show the results of the conventional search engine search in frame 402. Other buttons or display frames can include a request transfer of the same query or a clarified or searcher-rewritten query, an indication that a received query has been transferred, turn on speech-enabled search capability so that cellphone users (and other speech-oriented users of the system) may access the speech-enabled searchers, and send voice messages to users, etc. using appropriate frames and button controls. This GUI could also be updated each time the searcher activated a button and each time the server 118 updated database 156 entries associated with the searcher GUI. The query server 118 or the client side 122-128 may control the GUI using a variety of implementation platforms including Flash, Flex, J2EE, XML, AJAX, Ruby, etc. The GUI also can have bookmarks, etc. for the searchers favorite tools, databases, often used results, etc. The GUI can provide sections of the screen that automatically fill with results of the query being passed to other search engines or websites and returning results in those frames (or separate windows) without the searcher needing to copy and re-enter the query. The searcher may interact with any of the search engines or websites independently until the searcher finds information that is highly relevant, which may then be selected, copied, and pasted into the results window. Once the collection of data is accumulated in the results window, it may be sent to the user's "results" window or frame. This may be accomplished by copying the data over the network from the searcher's results frame (or window) 392 to the user's results frame (or window) 340, which may need to be opened (and an advertising frame or window may be closed simultaneously).

Alternatively, selected areas of the information being searched may be dragged and dropped to the results window by a mechanism similar to selecting a Google listing (or other search engine's listing) in Microsoft Internet Explorer and dragging the listing paragraph to another application such as Microsoft Word and dropping it there to have it inserted. A similar mechanism would be used to drag a selected listing paragraph from search engine results frame 402 and drop the selected information into results frame 392.

Alternatively, an HTML or XML source interpreter may be implemented which interprets the source of the website or information that is being accessed and treats the selected area of the display as an object comprised of tagged sub-objects that can be more intelligently accessed by other applications. Each distinct search engine, website, or source of information may need its own form of translation in order to identify the sub-components of the information that will be sent via the searcher's results frame to the user's results frame. Tagged information might include elements such as title, description, URL, etc. . . .

Typically, the searcher's and user's results frame would be filled with links that look similar to those of current search engines. Alternatively, actual text, graphics, audio, video, or other information files may be returned by dragging and dropping to the results frame, similar to what is accomplished with operating systems such as Windows where files may be copied by dragging and dropping to another location.

The user-facing part of the system 102-112 preferably operates as a web application through a browser on a personal computer or as a voice application through an interactive voice response system. Typically, this would be a thin client, getting most or all of its data via the web page server, which can be a component of the query server 118. The query server might be one monolithic computer or it could be a distributed network of computers that slice up the processing of webpage serving, ad serving, query and results search, database accesses, etc. Alternatively, the user-facing portion of the system may be a standalone application or a part of a standalone application (e.g. implemented through an SDK).

The searcher-facing portion of the system 122-128 may also be implemented as a browser-based thin client that allows all of the significant processing, data flow, various information source connections, and data manipulation to occur at the server. However, preferably, because of scaling issues (i.e. handling very large volumes of users who each may require searchers to be checking many sources per user), it is preferable to implement the searcher-facing portion of the system via a locally dynamic application that might run standalone or might run in the context of a browser. There are many examples of locally dynamic applications that do significant processing on the client side (in this case, searcher side 122-128) while relying on data structures that exist on a server (in this case, the query server 118 which houses the database 156). Some examples of locally dynamic applications include Google Earth (web-based mapping software), implemented using AJAX (Asynchronous Java combined with XML), and Basecamp (web-based project management software), implemented using "Ruby on Rails".

Figure 8:
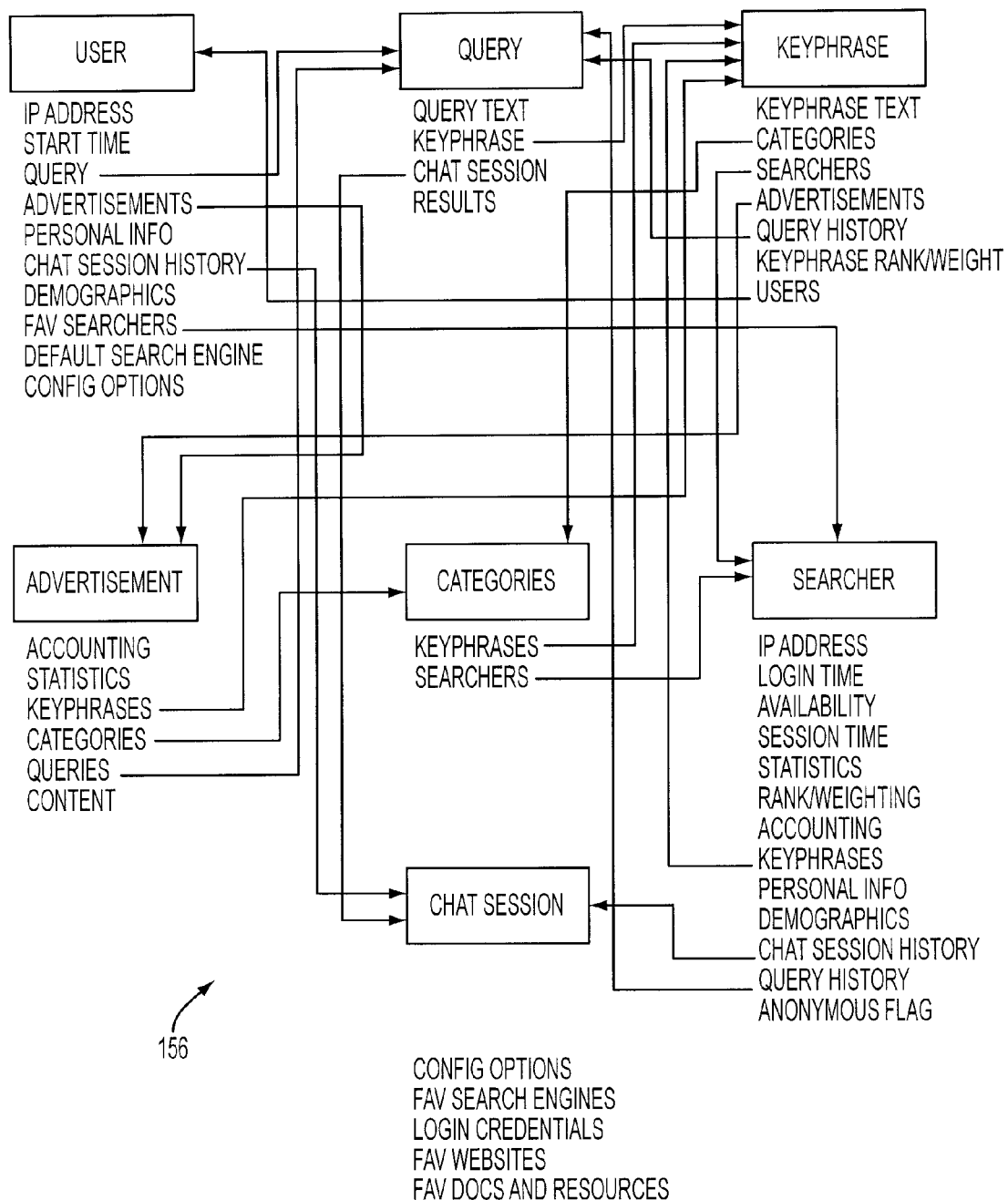
FIG. 8 illustrates a database.

The user- and searcher-facing parts of the system may be implemented using these various mechanisms, but the heart of the system is in its database 156, which is preferably resident at the query server 118, which itself may be one or many computers working in harmony to implement various data structures. FIG. 8 shows the relationships of the data structure types. Primary data structure types are implemented for the user, the searcher, the keyword, the query, the advertisement, the category, and the chat session. Within these primary structures, there are pointing relationships to the other types. In this system, data structures are comprised of single instances and/or lists of these data types. For example, each user is associated with a user data structure, which has local data such as IP address, start time, personal info and demographics while also having pointers to the query that the user has made, a list of advertisements that the user has seen or is scheduled to see, the chat session between the user and a searcher (or searchers), a link to the current searcher, and a list of favorite searchers that might be prioritized for this user in the future.

Similarly, the query structure has local data such as the query text and results as well as pointers to keywords associated with the query, and a chat session associated with the query.

Other relational connections are presented in FIG. 8 showing various data types of the database 156.

One example of the framework that may be used to implement the functionality includes having the searcher-facing part of the system implemented as a WinForm application using .NET 2.0 using C# with embedded Flash 8.0 elements for capabilities such as the chat session portion of the interface. The database may be implemented using SQL Server 2000. The user-facing part of the system can be a Microsoft Internet Explorer running on a PC with the Flash 8 Plug-In.

An important feature of this invention is that information that is located on the searcher's hard drive, intranet, or local environment may be searched, for example using automated desktop search engines offered by Google and others and/or via manual searching in a directory of a hard drive or on a local network. When relevant information is found using this method, the searcher may select, drag, and drop information from this "local" source, but the referenced document must be copied first to a publicly-available website, which is readily available via companies such as GoDaddy.com and others. When the searcher sets up their configuration, a public website (and login credentials) must be identified to the searcher tool so that local data may be searched, copied to the public website, and referenced in the results with a link to this publicly available website. Alternatively, the search system itself may make files publicly available, on behalf of the searcher, at the query server 118, at the searcher tool system 122, or elsewhere.

Files can be automatically transferred using a File Transfer Protocol (FTP) by the searcher tool system 122 to the public site, wherever it is located. The reference pointer (i.e. URL) given to the user via the results 484-486 will be to the material which has been copied to the public website where the searcher has permission to store documents (of any form such as text, images, audio, video, etc . . . ).

This function of accessing the "Deep Web" (i.e. the very large volume of documents and information that is not commonly available via the most popular search engines today) is accomplished by allowing the broad base of searchers associated with keywords to have the ability to include materials that are not readily indexed via traditional search engines (e.g. Google, Yahoo, MSN, AskJeeves, Dogpile, or others).

Searchers who sign up for particular keywords are motivated to collect excellent resources in order to provide relevant answers quickly to users. This increases the searcher's points and rank so that they may be compensated at a higher rate. Other searchers may be self-motivated to provide excellent results because they have had a medical experience themselves and would like to help others in need of timely information about the same issue. Other searchers may have a passion for a hobby that motivates them to make themselves available to help others in real-time regarding that hobby.

The database 156 can include entries and a pointer-based structure as depicted in FIG. 8. This data structure or database 156 includes cross-linked entries for query, keyword, searcher, user, query, advertisement, categories, and chat session. Within these structures, there include entries for logged-in status of searcher (availability), rank (or weighting) of searcher, rank (or weighting) of keyword, searcher statistics such as number of searches, number of accepted (by user) searches, user identification (and/or IP address of user), name, address, demographics about users and searchers, search results, advertisements (game, video, text, audio, etc.), advertisement statistics, accounting information, anonymity flags for user and searcher, searcher availability, query clarification and request (and/or chat session log), and an indication as to whether the searcher is available for general searches, query follow-on, etc. The statistics for a searcher can include the total number of searches, the number of successful searches, the average speed of the searcher, the latency of the searcher before starting and ending a search, the average number of results returned by the searcher, the availability time of the searcher, etc.

During a search sequence as depicted in FIGS. 9A-9C, when the user first accesses the search system web site, the user is presented with a query GUI 460 in the browser window 461 (FIG. 9A). This GUI 460 includes a frame 462 where the user can enter a natural language query, keywords, etc. (that can be similar to what might be entered at the Google or AskJeeves websites). The GUI 460 also includes a search button 464 that is activated when the user is ready to perform a search on the query. The query GUI 460 can also include controls 466 and 468 that can highlight when the cursor passes over them and that when activated ("clicked-on") will connect the user to a page that provides information on becoming an advertiser and becoming a paid searcher, respectively.

After the user initiates the search with the button 464, the browser window is loaded with a search GUI 470 (FIG. 9B). This GUI 470 includes a frame 472 where the user is presented a message that indicates that a searcher will be provided shortly. The user is also presented an advertisement in advertisement frame 474. There may be a variety of formats of advertisements. There may be multiple advertisements on the page. When a searcher accepts the query, a message 474 indicates that a searcher has been assigned and when the searcher is not anonymous, the name of the searcher may be presented in the chat frame 476, perhaps with the searcher asking a clarifying question. Items that are typed by the user 477 show up in the chat frame 476. A status frame 478 is updated with the status and progress of the search as it changes. When results become available, even though they may be preliminary, the results can be presented in frame 480.

When the search is completed, the user is presented with a search results GUI 482 (FIG. 9C), that includes one or more search results 484 and 486 that can include text descriptions, URLs, etc. When the user is not satisfied with the search the user can request a new search by activating "same search with new searcher" button 488. The user is also allowed to start a new search by entering a new query in frame 490 and activating the search button 492.

FIG. 10A illustrates an example of a searcher login screen 500 which the searcher sees after invoking the application but before being engaged in an actual search for a user. This screen 500 includes frames 502 for an elapsed time since the previous query. Also included is a frame 504 that shows the searcher the list of keywords for which the searcher has committed to do searches. (During the first invocation of this application, the searcher is preferably offered an online tutorial that teaches how to sign up for keywords using this application as well as tips about what keywords might be better choices). Preferably, the searcher signs up for a short list (e.g. three) of keywords initially until the searcher proves that he or she provides timely and relevant results (which will result in a higher ranking for the searcher). The searcher may sign up for more keywords by logging in and pressing the "sign up" button 508. Keywords will then be listed in frame 504 showing not only the keyword but also the searchers ranking for that particular keyword (e.g. "5/7" means that there are seven searchers who are logged-in and who have signed up for this same keyword. Of those seven, this searcher is ranked fifth). A delete button 506 allows the searcher to delete any highlighted keywords from the searcher keyword list. The sign-up button 508 allows the searcher to sign-up for additional keywords, preferably by opening up a new screen (see FIG. 10E as well as the description below). The searcher can sign up for voice based searches using a check box 510 and a test button 512 allows testing of the voice components (speakers, microphone, etc.) needed for a voice query. A configure button 514 allows the user to obtain a screen for configuring the searcher tool (see FIG. 10C).

FIG. 10B shows the query receipt screen 550 with the example query about the World Series previously mentioned having been received by the searcher in frame 382. The third party search engine results for the query are shown in frame 402. The searcher's preferred third party search engine(s) may be chosen by the searcher (see FIG. 10O). A frame 518 is provided that shows the searcher's favorite websites associated with the keyword that was used to select the searcher. The searcher may select these favorite websites in advance (see FIG. 10O). A local search frame is provided allowing the searcher to check his or her own local hard drive or intranet to find relevant information related to the user's query. Also, a frame 522 for a custom URL where the searcher may enter any URL at all to access the entire web in order to find relevant results on behalf of the user. The searcher can send partial search results or final results via buttons 524/526 and log out via button 528. When the searcher accepts the query, button 552 is selected. The searcher may choose to transfer the query to another searcher using button 554 (also see FIG. 10D). The query time is displayed 556 showing the searcher how long this query has been "live".

Figure 10C:
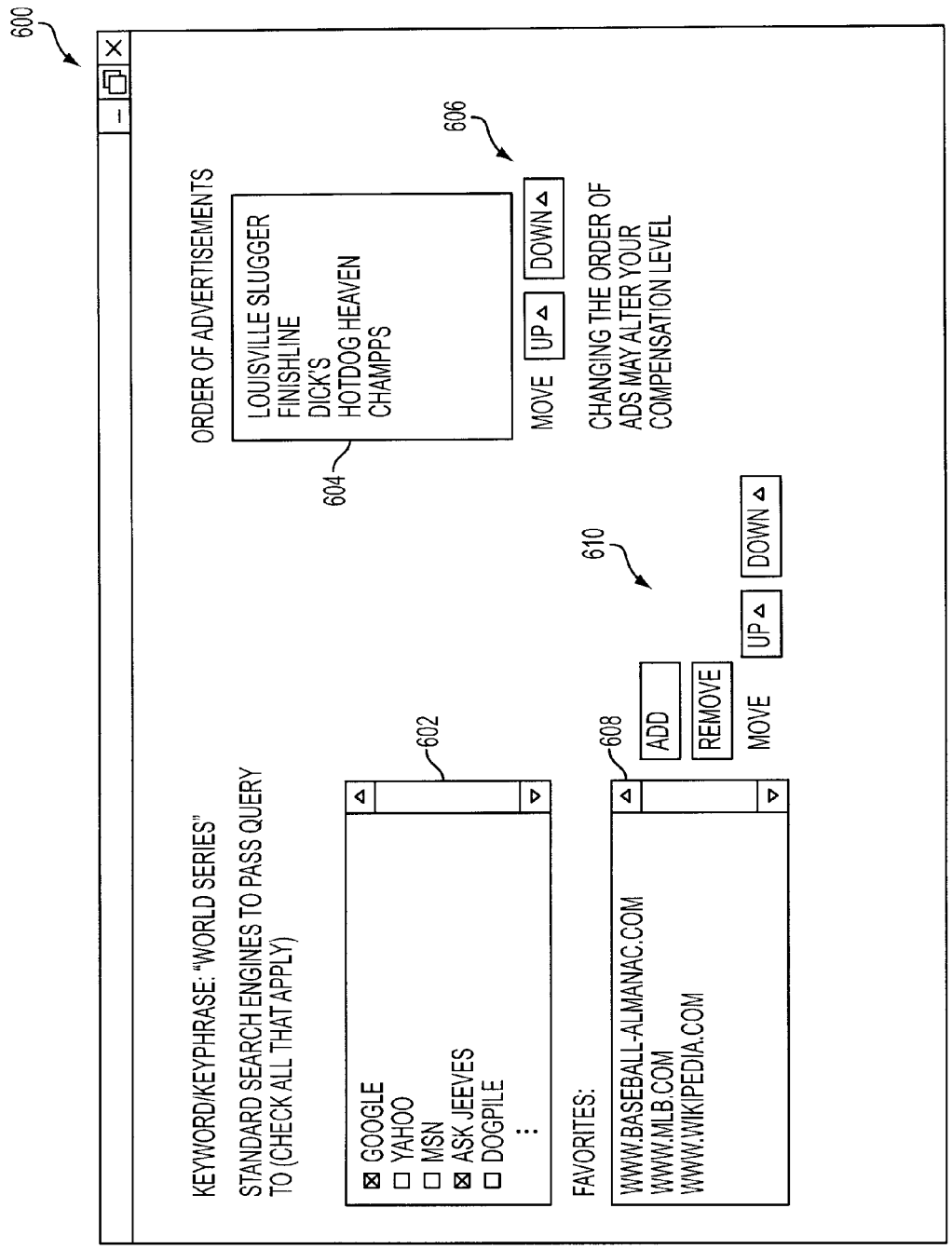

FIG. 10C shows the searcher screen 600 used to configure the searcher tool for particular keywords. This screen is reached by clicking on the "Configure" button 514 on searcher tool screen 500 (see FIG. 10A). The searcher can specify which search engines are used in frame 602 and the sequencing of the advertisements in frame 604 using up/down sequence buttons 606. The searcher's favorite websites for finding information about the keyword can be listed in frame 608 and the listings can be sequenced via up/down buttons 610.

Figure 10D:
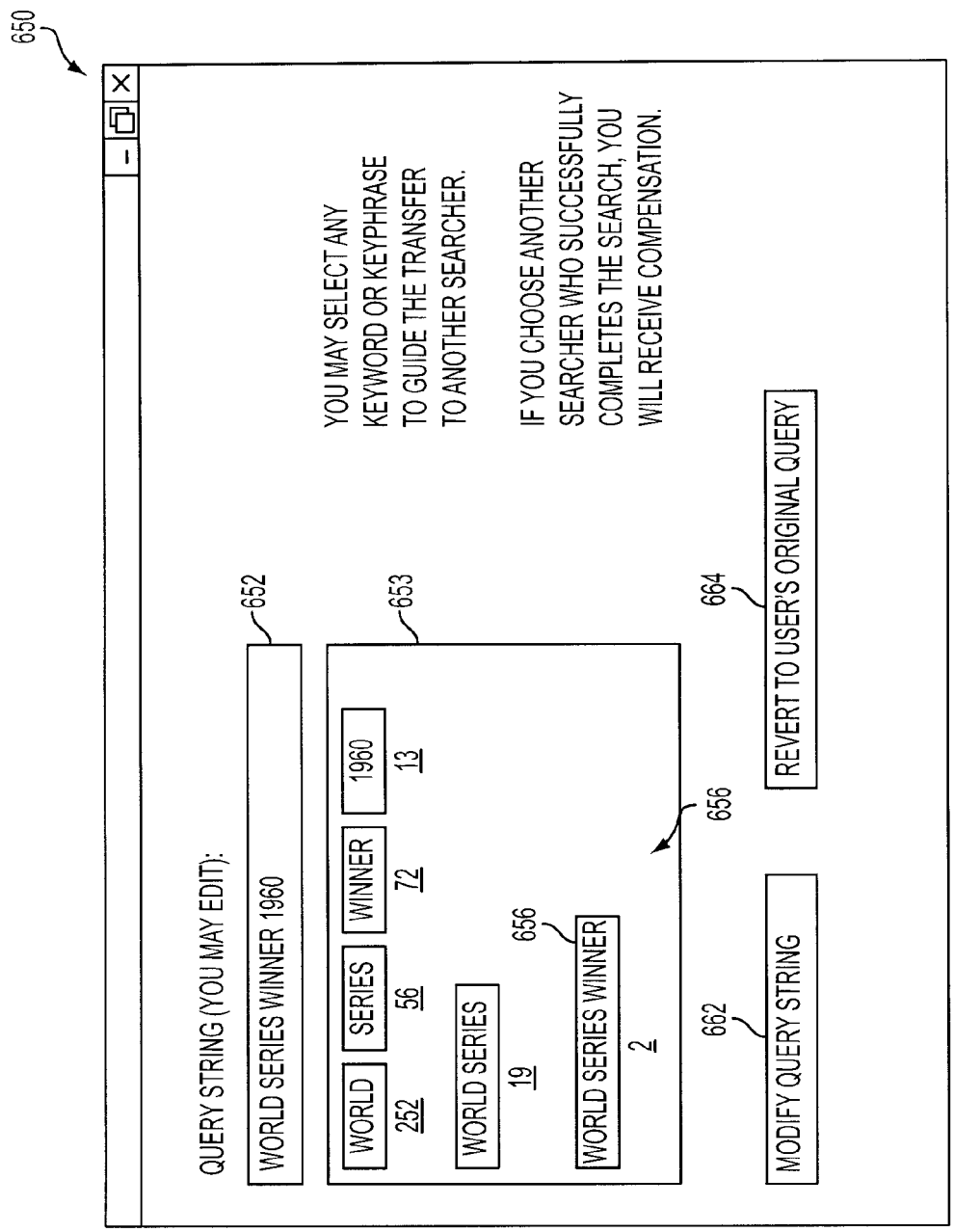

FIG. 10D illustrates the screen 650 used to transfer a query to another searcher. The query is shown in frame 652 while the various component keywords 654 of the query are displayed in frame 653. Below each component keyword, the number of active searchers 656 for the keywords/phrases of the query are shown. Buttons 662, 664 are also provided that will allow the searcher to change the query, which will result in new component keywords, etc. The searcher may cause a transfer to occur by selecting the keyword button 654 that would likely result in a more successful set of results being returned for this query. The searcher may be compensated for transferring to a searcher that provides a successful result to the user.

FIG. 10E shows the screen 700 used by the searcher to sign-up for keywords. Available keywords are listed in frame 702. "Available keywords" may include all known keywords, or during the system startup phase when searchers are just beginning to sign-up, the list may be a controlled subset of keywords. For example, the system might start with only the 500 most popular keywords used in searches by the general population. Or the system might offer keywords in a particular category such as medicine or sports. This frame 702 shows the keyword, its weight which indicates the "strength" of this keyword when found in a search query phrase. (i.e. if a keyword has the most weight in a query phrase, then that keyword determines which searcher pool from which to find an available searcher)see FIG. 3A). The number of searchers signed up and logged in for the keyword is also shown. The number of queries in the last hour (or alternatively, last day, week, or any other period of time) on the keyword is shown along with the ratio of queries to logged-in searchers. This data allows an experienced searcher to carefully choose keywords that will result in the searcher being able to earn more searching opportunities and possibly a higher ranking. Providing this level of detail creates "efficiency" in the system, similar to what might be found on the trading floor of the stock market.

When a searcher discovers information that appears to satisfy the user's query, such as a passage in a book on the users personal bookshelf, the passage and possibly surrounding contextual material can be scanned in and posted on the searcher's public web site (as described earlier), assuming copyright laws are adhered to. The searcher can then provide the user with the passage of interest and a link to the website scanned version, possibly a link to a neighborhood library that includes a copy of the book, and/or possibly a link to a bookseller's website (e.g. Amazon) where the book may be purchased. The search system can then add this information to the database so it is accessible to the searcher for future searches and to users for whom the searcher is searching. A desktop search capability may be installed as part of the searcher tool installation, which may be a local application running on the PC, a browser-based application, or server-based application that presents its information via a web-browser. Google Desktop Search is one such example.

To facilitate having searches performed by searchers who are experienced in searching the subject matter of the queries, the searchers, when they initially register as a searcher in the system, select keywords or categories of keywords that indicate their search expertise and/or experience (see FIG. 10E). This set of keywords selected by a searcher can be updated as a searcher obtains a wider field of experience or simply becomes more accustomed to using this system. The system remunerates searchers for successful searches (e.g. which the user views as relevant and useful) and, as a result, it is expected that various searchers with a wide variety of search expertise will be logged in (available) to provide coverage at all times. The remuneration can be based on the advertising revenue thereby providing an incentive to the searcher to provide satisfactory results and, when given the option, to select advertisements relevant to the search query, hopefully maximizing advertising revenues. In addition, the remuneration may be based on the proportion of successful searches (accepted search results) and this provides the searchers an incentive not to accept searches that are outside their field of search expertise. Or, if the searcher determines that he or she is not qualified to deliver a satisfactory result, the searcher is motivated to "transfer" the query to another searcher who can deliver a satisfactory result. If a query is transferred, the searcher may receive some credit if the next searcher delivers a satisfactory result to the end user, thereby motivating the original searcher to carefully transfer the request (see FIG. 10D). The amount of credit may also be based on how quickly the searcher determines that a transfer is appropriate. This system also provides motivation for the searcher to only sign up for keywords for which he or she can provide a satisfactory response to the end user in a timely fashion. A searcher need not be an expert in the subject matter of the query but is expected to be capable of locating information relevant to the query. The present invention will work best when the system has a large number of searchers that are available 24 hours a day, providing coverage regarding anywhere from a thousand (at system startup) to hundreds of thousands (or even millions) of keywords (a system that has evolved to have sufficient searchers to cover the large number of keywords. To help insure that such a mass of searchers sign-up to be paid searchers, the system can split the advertisement revenue with the searchers based on a formula as previously discussed. The system can also provide a different or additional reward to searchers based on their relevance ranking. The relevance ranking can include one or more that one factor, such as average search speed, number of accepted searches performed, number of searches performed, amount of cumulative time answering queries regarding a particular keyword, number of keywords that they search, etc. However, it is preferred that the system provide a reward that rewards the best searchers, is graduated, rewards a large number of people, rewards a few with a very large reward, attracts media attention, engenders discussions among users and searchers of the system with other associates and contacts, can cause many searchers to compete to be the "best", provides incentive for searchers to sign up to keywords for which they can be particularly successful, and provides incentive for searchers to be logged in (available) as often as possible. One example of such a reward system is a reward pyramid that gives a few searchers a very large reward while many searchers receive some reward. This mechanism can be used to convince a large number of people to sign up as paid searchers. Such a pyramid might pay $1 million to the top searcher during a period, $100,000 to the ten next best searchers, $10,000 to the hundred next best searchers, $1,000 to the thousand next best searchers, and $100 to the next best 10,000 searchers. In this way, this particular bonus system involves 11,111 people. The reward could be issued on a yearly, quarterly, monthly, weekly, or daily basis.

An alternative embodiment involves having a "PC anywhere" (remote control) or WebEx (remote meetings) type of experience for the end user who does not directly control the search screen but can watch what the searcher is doing to accomplish his or her task. This allows the user to be entertained, occupied, and engaged by what the expert searcher is doing.

The user may comment in the "chat" frame in ways that allow for the search to be accomplished more collaboratively. For example, during a search about the winner of the 1960 winner of the World Series, the user could say via the chat screen (while watching what the searcher is referencing): "What I really wanted to know was who was pitching for the winning team in that game." And the searcher could comply with that clarified request.

An alternative embodiment allows a searcher to "see" unhandled queries. When a searcher logs into the system, the searcher can get access to a list of current queries and keywords that are associated with the queries. The searcher can also see queries for which no search has been accepted after a predetermined period, such as 10 seconds, and accept such a query, and such queries that are accepted and successfully searched can be provided a higher rate of remuneration.

Rather than present the search results to the user one searcher set at a time, the search results of all searchers that perform a search on the query can be presented to the user. This will increase the likelihood that relevant search results are presented to the user. The searchers involved in such a presentation would share the credit (remuneration) for a successful result. The system could also allow searchers to form searcher groups that would facilitate such group results presentation.

A user could pay to subscribe to the search service and not be presented with advertisements.

If a searcher's "relevance rating" drops to a predetermined threshold for a particular keyword or across all his/her keywords, the searcher could be suspended (or permanently barred) from the system. There may be other reasons that a searcher gets suspended. For example, a user may report a searcher as being extremely rude, obnoxious, or inappropriate in their language or behavior, which could be reviewed by the service managers or system administrators.

A user may also be cutoff from the service if he/she is being rude, obnoxious, or inappropriate. Because the identity of the user is oftentimes not known, the user would be cutoff by refusing packets from a particular IP address. If the behavior continued, the service managers or system administrator could take legal action. The response that the user would receive to all queries would explain the consequences of inappropriate behavior, including legal action.

Similarly, when a searcher abuses the system the searcher could be cutoff. For example, if someone signed up as a searcher and provided "not relevant" results most of the time, across multiple keywords, the system could disable the searcher's account. The IP address could be monitored as well.

Advertisements presented to a user can be of different lengths and subjects based on the keywords of the query, the point of the search cycle, the priority of advertisers as set by the system, the priority of advertisers as set by a searcher, etc. The database also includes information on the number of times an advertisement has been presented to a given user (either an identified user or a user at a given IP address), the number of times users have linked to any web site noted in the advertisement, etc. Advertisements may be managed via a product such as "Macromedia Flash Media Server 2" and/or other products.

The keywords of the database can include all of the words of a dictionary and groups of words that have an ordering. Keywords can also be weighted to allow them to be sorted higher in the ranking of searchers for receiving the query (see discussion related to FIG. 3B). Because it is more specific, the phrase "breast cancer" may be ranked higher than the two words "breast" and "cancer", so that the ranking of "breast cancer" searchers would not include searchers that specialized in searches of the words "breast" or "cancer" individually. That is, keywords or phrases that are often used for a particular type search can be ranked higher in order to result in the selection of a searcher that has a higher level of experience in that specific area of search.

The keyword/keyword database also indicates how many queries have included a particular keyword, as well as how many searchers are associated with that keyword. A ratio of queries versus associated searchers gives searchers the opportunity to find keywords that are more likely to generate traffic for the searcher, which may increase the searcher's income, if the searcher provides relevant results to the end user.

The database also indicates how many times a searcher has searched a particular keyword and how many times the searcher has been successful for the particular keyword.

Queries, associated keywords and corresponding answers can be removed from the database when they are no longer considered relevant. A calculation of relevance can be performed every time that a new user receives the "answer" and chooses to ask for another exact search (indicating a lack of useful data or relevance). If the user accesses the answer and does not request another search with the same search terms, then the original searcher who reported the answer is credited with points. If the user does ask for another search with the same (or possibly similar) terms, then the searcher may have points deducted. The ratio of users who consider the answer relevant versus not relevant is tracked. If this ratio hits a threshold, then the answer may be deleted from the system, or alternatively it can be saved for archival but not reported to future users who make the same (or a similar) query.

In another embodiment, it is possible for the server to host all of the logic of loading and searching multiple search engines and websites in an ASP-type environment where most of the searching computation across search engines happens at the server. In the preferred embodiment, much of the searcher computation is performed in a distributed way via the searchers' computers.

In another embodiment, the searcher tool interface is defined in an "open" way so that third-parties may provide better and better tools, perhaps tailored for specific keywords, categories, or industries including medicine, travel, shopping, etc. ...

In another embodiment, it is possible for a user's "default search engine" to return results in a window frame while the searcher is doing more extensive research and the user is presented with advertisements. This lets the user see some results as quickly as they would see them from one of the standard top search engines.

In another embodiment, harder queries can be sent to searchers who have signed up for "paid search". The queries are sent to the available searcher pool for a given keyword or set of keywords along with a bid for how much would be paid if the query were answered within a specified period of time. The first searcher to "lock" the query can then spend whatever time is necessary to answer the question and collect the payment from the user. This differs from Google answers because there is a pool of searchers available at all times who are associated with specific keywords.

There are many applications that can run better using this platform, creating a better user experience. For translating text from one language to another, you would simply query: "translate from english to spanish 'I love you'." The expert searcher might be using a translator service such as altavista to get that answer. One nice thing is that those who are VOIP-capable would be able to hear the translation from a native speaker, in addition to getting the text translation.

With the present invention users get significantly improved highly-relevant search results from a broader base of information than current search engines can index; keyword-targeted searchers are enabled with powerful searcher tools that can adapt to the domain being searched; there is a process for having searchers compensated for helping find the answers that provides motivation for a large pool of searchers to be available in a variety of domains of searching expertise; and advertisers get to have their (sometimes hand-picked) ads seen be a highly targeted audience.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of performing a search comprising:
receiving a request for information from a query source;
choosing an item based on a keyword of a query of the request when human searchers are allowed to register for the keyword;
providing an interface including controls optimizing a human assisted search to a human searcher when determining that the human searcher is a highest ranking human searcher of human searchers accepting the query;
including a ranked list indicating the item in the interface;
receiving from the human searcher a selection indicating the item;
providing the item to the human searcher;
selecting a search result based on a content of the item; and
providing the search result to the query source.

2. The method of claim 1 comprising:
choosing the keyword when determining that the keyword is a highest ranking keyword of the query.

3. The method of claim 2 comprising:
determining the ranking of the keyword based on a specificity of the keyword.

4. The method of claim 2 comprising:
determining the ranking of the keyword based on a number of human searchers registered for the keyword.

5. The method of claim 1 comprising:
including in the ranked list an indicator of a search resource configured for the keyword.

6. The method of claim 1 comprising:
including in the ranked list an indicator of an advertisement ranked for the keyword.

7. The method of claim 1 comprising:
including in the interface a ranked list of search results produced by submitting the request to a search engine; and
selecting the search engine based on the keyword and the human searcher.

8. The method of claim 1 comprising:
choosing the keyword from a set of keywords determined based on word frequency in a corpus; and
limiting a count of the set to a predetermined value.

9. The method of claim 1 comprising:
adjusting the ranking of the human searcher when determining that a notification of the request delivered to the human searcher is pending for a pre-determined time interval.

10. The method of claim 1 comprising:
including in the interface an indicator of the request, an indicator of a weighting of the keyword, an indicator of the keyword, and an indicator of an alternate keyword of the query.

11. The method of claim 10 comprising:
determining the weighting of the keyword based on a number of searchers registered for the keyword.

12. The method of claim 10 comprising:
receiving from the human searcher the selection indicating an advertisement ranked for the keyword;
providing audio or video information to the query source for a pre-determined time interval based on a most recent action performed on the request;
receiving from the human searcher a selection of the indicator of the alternate keyword; and
delivering a notification of the request to a highest ranking human guide associated with the alternate keyword.

13. The method of claim 1 comprising:
providing to the human searcher a statistical datum of a plurality of searches including the keyword and a plurality of human searchers registered for the keyword; and
registering the human searcher for the keyword based on the selection by the human searcher.

14. The method of claim 1 comprising:
including in the interface an indicator of the request, an indicator of keywords of the query;
receiving a modified query indicating an additional keyword from the human searcher; and
refreshing the interface based on the additional keyword.

15. The method of claim 1 comprising:
choosing the keyword from a set of keywords determined based on a category selected for the query; and
limiting a count of the set to a predetermined value.

16. The method of claim 1 comprising:
including in the interface a search tool accessing an unpublished resource; and
copying a portion of the unpublished resource selected by the human searcher to a public website.

17. The method of claim 1 comprising:
comparing the query to a most recent previous query received from the query source; and
determining a rating of a previous search result provided to the query source based on the comparing.

18. The method of claim 17 comprising:
ranking the human searcher for the keyword based on the rating;
adjusting the ranking based on requests accepted by the human searcher; and
modifying the ranking based on searches transferred by the human searcher.

19. A non-transient computer readable storage medium including an instruction stored therein for causing a computer to execute a process comprising:
receiving a request for information from a query source;
choosing an item based on a keyword of a query of the request when the keyword is included in a predetermined set of keywords which can direct requests to human searchers;
rendering an interface including indicators facilitating a human assisted search to a human searcher when the human searcher is a highest ranking searcher notified of the query and the human searcher accepts the query;
including a ranked list indicating the item in the interface;
including a search result produced by submitting the request to a search engine;
selecting the search engine based on the keyword and the human searcher;
receiving from the human searcher a selection indicating the item;
providing the item to the human searcher;
obtaining an edited search result from the human searcher based on the providing; and
sending the edited search result and an indicator of the item to the query source.

20. A search apparatus comprising:
a query source computer providing a request for information;
a searcher computer rendering an interface including indicators optimizing a human assisted search to a human searcher and searching a storage accessible solely via the searcher computer; and
a search system receiving the request for information, choosing an item based on a keyword of a query of the request when human searchers are allowed to register for the keyword, ranking the keyword based on a number of searchers registered for the keyword, providing the interface to the searcher computer when determining that the human searcher is a highest ranking searcher which has accepted the query, including a ranked list indicating the item in the interface, receiving a selection indicating the item, providing the item to the searcher computer, obtaining a search result obtained using information from the storage and providing the search result to the query source computer.

* * * * *